United States Patent

Scanlon

[15] 3,681,782

[45] Aug. 1, 1972

[54] MACHINE PROCESS FOR POSITIONING INTERCONNECTED COMPONENTS TO MINIMIZE INTERCONNECTING LINE LENGTH

[72] Inventor: F. Taylor Scanlon, Phoenix, Ariz.

[73] Assignee: Honeywell Information Systems Inc., Waltham, Mass.

[22] Filed: Dec. 2, 1970

[21] Appl. No.: 94,464

[52] U.S. Cl. ....................................444/1, 235/151.1

[51] Int. Cl. ..............................................G06f 15/46

[58] Field of Search........235/150, 150.1, 151, 151.1; 444/1

[56] References Cited

OTHER PUBLICATIONS

Fisk– " Accel: Automatic Circuit Card Etching Layout," Proc. of IEEE, Nov. 1967, pages 1,971–1,982.

Rutman– " An Algorithm for Placement of Interconnected Elements Based on Minimum Wire Length," – AFIPS Conference Proceedings: Vol. 25, 1964, succ–pgs. 477– 491.

Loberman et al., " Formal Procedures for Connecting Terminals with a Minimum Total Wire Length" Journal of the ACM, Vol. 4; pages 428– 437, Oct. 1957.

*Primary Examiner*—Joseph F. Ruggiero

*Attorney*—Fred Jacob and Edward W. Hughes

[57] ABSTRACT

A machine process is disclosed in which components of an interconnected network are simultaneously repositioned and their interconnections simultaneously reordered to minimize interconnecting line length. The repositioning and reordering process is performed first on nets having two components, then on nets having three components, etc., until all nets have been processed. The components are repositioned in accordance with a formula which allows large movement of interconnected components towards each other but prevents overshoot of such components. In this way, the components can be rapidly rearranged to achieve an efficient interconnecting pattern.

20 Claims, 46 Drawing Figures

INVENTOR.
F. TAYLOR SCANLON
BY Calvin E. Thorpe
ATTORNEY

CIRCUIT BOARD

MODEL OF CIRCUIT BOARD

| MODULE IDENTITY ON MODEL | MODULE IDENTITY ON CIRCUIT BOARD | COORDINATES OF MODULES X | COORDINATES OF MODULES Y | TYPE OF MODULE |
|---|---|---|---|---|
| A | 1 | 1.0 | 5.0 | FREE |
| B | 2 | 2.5 | 5.0 | FREE |
| . | . | . | . | . |
| . | . | . | . | . |
| K | 11 | 5.5 | 2.0 | FREE |
| L | 12 | 5.5 | 5.0 | FIXED |
| M | 13-18 | | 1.0 | FIXED Y BAR |
| N | 19-22 | 0 | 4.3 | FIXED |
| O | 23-26 | 0 | 3.0 | FIXED |
| P | 27-30 | 0 | 1.7 | FIXED |

OVERVIEW OF CONVERGE ALGORITHM

FIG-9A

```
C MAIN2     SCANLON OVERLAY 2 MAIN CONTROL
*
      SUBROUTINE MAIN2
*
      COMMON LET(21),NETS(1000,11),NETWHT(1000),NUMNET,POSITN(2,300),
     1       SITE(2,300),NSITE(300),ITABLE(300),LBAR(300),NFREE,NFIX,
     2       NFIXCX,NFIXCY,TOTAL,GREAT,FRAC,FRAC1,FRAC2,STOPA,STOP1,
     3       STOP2,XCENT,YCENT,XAVE,YAVE,LOOP1,LOOP2,RADIUS,NRUNS,
     4       NSS(5),INCRMX,NRORD,IXTRA,ARG1,RMIN,ASCALE,BSCALE,IRG1,
     5       IRG2,IRG3,IRG4,MSCALE,NPRNT,TOTAL1,RPRADI,NCHANG,ITERAL,
     6       LORDAL,RADIY,NAVER,NPX,NNX,NPY,NNY,
     7       VECTOR(2,300),XPLIST(100),XNLIST(100),YPLIST(100),
     8       YNLIST(100),PHYSCL(2,300),KONEX(300,100),Y(2,400),
     9       NKONEX(300),NPOSIT(300)
      COMMON/TITLE/ NTITLE (3),LISTNT,LISTPN,LISTCH,LISTPT,MODE(3)
      COMMON/TITLE/ NDAY,TIME
      COMMON/STATE/ PROCES (3),NOWPRO,ITSAVE,NOWMOD
      COMMON /SCN/ MMODL,MMODF,MPEF(11),MCNET(21)
      COMMON /SCN/ IPEF,ICNET,ITR
      COMMON /SCN/ IWERR,IERR,IOERR
      COMMON /SCN/ MCCNT(14),MAXNET,MINNET
      COMMON/BOARD/BDESIR(2),SDESIR(2),DIMENX,DIMENY,PITCHY
      COMMON /OPT/ MSWT1,MSWT2,MSWT3,MSWT4,MSWT5,MSWT6,MSWT7,MSWT8
      COMMON /OPT/ MSWT9,MSWT10,MSWT11,MSWT12
      DIMENSION MODES(3)
      DATA RCNVRG/6HCONVRG/,RBLOW/6HBLOWUP/
      DATA FIXON/6HGRDFIX/
      DATA MODES/6H STAR ,6HSERIAL,6HSHRTST/
      DATA JREPEL,NOREPL/6HREPLSE,6HNOREPL/,KINIT/6HINITAL/
*
*************************************************************************
*                                                                       *
* THIS SUBROUTINE IS THE MAIN PROGRAM CONTROLLING THE PLACEMENT PROCESS*
* AND THE ASSOCIATED SUBROUTINES,                                       *
* INPUT DATA WAS PREPARED IN OVERLAY1 AND IS READ IN FROM               *
* TWO SCRATCH TAPES                                                     *
* THIS PROGRAM INITIALIZES AND DIRECTS THE PROCESS OF OVERLAY 2.        *
*                                                                       *
*************************************************************************
* DESCRIPTION OF COMMON BLOCK VARIABLES
*     LET(21) - - - -1 LINE=126 CHARACTERS FOR LOCATION PLOT ROUTINE
*     NETS(1000,11) -HOLDS UP TO 1000 LOGIC NETS WITH UP TO 10 PINS/NET
*                    NET(J,1)=NUMBER OF PINS IN NET J
*     NETWHT- - - - -WEIGHT (REPEAT APPEARANCE) OF RESPECTIVE NET
*     NUMNET- - - - -NUMBER OF LOGIC NETS DESCRIBED IN ARRAY NETS
*     POSITN(2,300) -CURRENT COORDINATES OF 300 MODULES. X=1,Y=2.
*     SITE(2,300) - -ARRAY TO SAVE ORIGINAL POSITIONS
*     NSITE - - - - -POINTERS TO 'SITE' OF ORDER ON COORDINATE 'KORD'
*     ITABLE(300) - -ALPHA-NUMERIC NAMES OF EACH MODULE
*     LBAR(300) - - -FLAG =1 FOR FIXED POINT, =2 FOR X-BAR, =3 FOR Y-BAR
*     NFREE - - - - -POINTER TO LAST LOC IN POSITN WITH UNRESTRICTED X&Y
*     NFIX  - - - - -POINTER TO LAST LOC IN POSITN WITH FIXED COORDINATE
*     NFIXCX- - - - -POINTER TO LAST LOC IN POSITN WITH FIX-X, FREE Y
*     NFIXCY- - - - -POINTER TO LAST LOC IN POSITN WITH FIX-Y, FREE X
*     TOTAL - - - - -CURRENT TOTAL MANHATTAN LINE LENGTH IN INCHES.
*     GREAT - - - - -GREATEST INDIVIDUAL CONTRIBUTION TO LINE LENGTH
*     FRAC- - - - - -FRACTIONAL MULTIPLIER OF VECTOR FOR SMALL STEP SIZE
*     FRAC1,FRAC2 - -INPUT VALUES THAT MAY BE ASSIGNED TO FRAC
*     STOPA - - - - -CURRENT VALUE OF STOPPING CRITERIA (STOP1 OR STOP2)
*     STOP1 - - - - -RELATIVE CHANGE IN TOTAL TO HALT CONVERGE
*     STOP2 - - - - -SAME STOPPING CRITERIA FOR BLOWUP AS STOP1 AND
*                    MINIMUM SEPARATION FACTOR USED IN ,CALSRT,
*     XCENT,YCENT - -COORDINATES OF CENTER OF MASS OF ALL POINTS
*     XAVE,YAVE - - -AVERAGE DISTANCE OF MODULES FROM XCENT,YCENT
*     LOOP1 - - - - -MAXIMUM NUMBER OF ITERATIONS FOR CONVERGE
*     LOOP2 - - - - -MAXIMUM NUMBER OF ITERATIONS FOR BLOWUR PROCESS
*     RADIUS--- - - -AVERAGE PHYSICAL DIAMETER THAT SEPARATE MODULES
*     NRUNS - - - - -NUMBER OF REPEATS (SANS INPUT) OF ENTIRE PROCESS
*     NSS - - - - - -DUMMY SENSE SWITCHES UNDER PROGRAM CONTROL
```

```
*     NSS(3)- - - - -CONTROLS DISASSOCIATIVE REPULSION, 0-NONE, 1-REPEL
*     NSS(4)- - - - -CURRENT WIRING RULE * 1-STAR,2-SERIAL,3-SHORTEST
*     NSS(5)- - - - - CONTROLS LOCATION PLOT, 0- PSEUDO, 1-REAL
*     INCRMX- - - - -MAXIMUM NUMBER OF CONSECUTIVE LENGTH INCREASES
*                    BEFORE WARNING MESSAGE.
*                    ITERATIONS TERMINATE IF NUMBER OF CONSECUTIVE
*                    INCREASES EXCEEDS 20 PER CENT OF LOOP1 FACTOR
*     NRORD - - - - -ITERATIONS BETWEEN NET REORDERING (DISCONTINUED)
*     IXTRA - - - - -MODULE ID HAVING (ARG1) MAXIMUM VECTOR
*     ARG1- - - - - -MAXIMUM VECTOR REPORTED BY MOVE ROUTINE IN CONVERG
*                    OR =PHYSICAL OVERLAP FOR BLOW DURING BLOWUP
*     RMIN- - - - - -MINIMUM PHYSICAL DISTANCE BETWEEN TWO MODULES
*     ASCALE,BSCALE -SCALE FACTORS FOR GRAPH PLOT ROUTINE
*     IRG1- - - - - -=0 UNTIL ALL NETS ARE IN CURRENT COMPUTATION;THEN=1
*     IRG2- - - - - -ITERATIONS BETWEEN LOCATION PLOTS
*     IRG3- - - - - -ITERATIONS BETWEEN FUNCTION PLOTS
*     IRG4- - - - - -ONLY NETS WITH LESS THAN IRG4 PINS USED IN PROCESS
*     MSCALE- - - - -MAXIMUM ORDINATE FOR GRAPH PLOTS
*     NPRNT - - - - -=0 FOR NO PRINT OUT DURING ITERATIONS, =1 FOR OUTPT
*     TOTAL1- - - - -INITIAL TOTAL LINE LENGTH (AT START OF EACH RUN)
*     RPRADI- - - - -RADIUS OF DISASSOCIATIVE PHYSICAL REPULSION
*     NCHANG- - - - -TOTAL NUMBER NETS REORDERED IN PREVIOUS ITERATIONS
*     ITERAL- - - - -RUNNING SUM OF TOTAL ITERATIONS IN THIS RUN
*     LORDAL- - - - -RUNNING SUM OF TOTAL NET REORDERS IN THIS RUN
*     RADIY - - - - -NOT IN USE
*     NAVER - - - - -NUMBER OF PAST VALUES USED IN SMOOTHING TOTAL AVERG
*     NPX,NNX,NPY,NNY*VECTOR COUNT OF POSITIVE AND NEGATIVE SENSE-CALSRT
*     VECTOR(2,300) -TRANSFERS X AND Y COMPONENTS OF FORCES FOR POSITN
*     XPLIST,YPLIST,-LISTS USED BY CALC-SORT  TO SORT LARGEST POSITIVE
*     XNLIST,YNLIST,-VECTORS WITH LARGEST NEGATIVE VECTORS,
*     PHYSCL(2,300)- PHYSICAL VECTORS COMPUTED IN BLOW AND BOUNDS
*     KONEX(300,100)-FOR EACH MODULE, UP TO 100 CONNECTIONS TO IT
*     Y(2,400)- - - -ARRAY FOR GRAPH PLOT DATA, 2 FUNCTIONS, 400 POINTS
*     NKONEX(300)    -NUMBER OF MODULES CONNECTING TO THIS (UP TO 100)
*     NPOSIT- - - - -POINTERS BY SUBSCRIPT TO ORDER KORD IN 'POSITN'
*
*******************************************************************
*                                                                 *
* SEE ROUTINE 'ASSIGN' FOR DESCRIPTION OF SHARED COMMON IN ASSIGN PARTS*
*                                                                 *
*******************************************************************
* DESCRIPTION OF LABLED COMMON /TITLE/
*     NTITLE(3) - - -PROBLEM TITLE PICKED UP FROM FILE 20 IN INPOSI
*     LISTNT- - - - -COUNTER FOR OUTPUT OF NETS DATA * DMNETS
*     LISTPN- - - - -COUNTER FOR OUTPUT OF POSITIONS * DMPOSI
*     LISTCH- - - - -COUNTER FOR,DMPTCH,OUTPUT OF MODULE INTERCONNECTION
*     LISTPT- - - - -COUNTER FOR LOCATION PLOTS * PLOT
*   THREE MODES OF WIRE INTERCONNECTIONING ARE DEFINED BY WORD 'NOWMOD';
*     MODE(1) - - - -STAR  CONNECTIONS FROM SINGLE SOURCE
*     MODE(2) - - - -SERIAL  CONNECTION FROM SINGLE SOURCE
*     MODE(3) - - - -SHORTEST DISTANCE, NO SOURCE DESIGNATION
*     NDAY,NTIME- - -DATE AND TIME REPORTED BY MME GETIME
*******************************************************************
* DESCRIPTION OF LABLED COMMON /STATE/
*     PROCES(3) - - -THREE PROCESSES DEFINED BY'NOWPRO' ARE;
*                    (1)CONVERG, (2)BLOWUP, (3)GRIDFIX.
*     NOWPRO- - - - -DEFINES CURRENT PROCESS;1-CNVRG,2-BLOWUP,3-ASSIGN
*     ITSAVE- - - - -CURRENT ITERATION WITHIN CURRENT PROCESS
*     NOWMOD- - - - -DEFINES CURRENT WIRING RULE; 1-STAR,2-SERL,3-SHORT
*******************************************************************
* DESCRIPTION OF LABLED COMMON /SCN/ FROM OVERLAY 1
* WORDS OF INTEREST TO PLACEMENT PROGRAM (OVERLAY2)
*     MCCNT(J)  - - -NO. OF NETS HAVING 'J' PINS PER NET
*     MAXNET- - - - -MAXIMUM PINS PER NET FOR ALL NETS
*     MINNET- - - - -2 PER CENT OF NUMNET (USED IN PROGRESSIVE NET)
*******************************************************************
* DESCRIPTION OF LABLED COMMON /BOARD/
*     BDESIR(2) - - -MAXIMUM BORDER DESIRED IN 1-X AXIS AND 2-Y AXIS
*     SDESIR(2) - - -SMALLEST (MIN) BORDER DESIRED IN 1-X AND 2-Y AXIS
```

FIG. 9B

```
*     DIMENX- - - - -AVERAGE X DIMENSION OF MAJORITY OF MODULES
*     DIMENY- - - - -AVERAGE Y DIMENSION OF MAJORITY OF MODULES
*     PITCHY- - - - -DIMENY/DIMENX RATIO HEIGHT TO WIDTH
*******************************************************************
* DESCRIPTION OF LABLED COMMON /OPT/ FROM OVERLAY1
* WORDS OF INTEREST TO OVERLAY2 ARE:
*     MSWT2 - - - - -=NPRNT IS PRINT OPTION =1 FOR ITERATION OUTPUT
*     MSWT3 - - - - -=NSS(4)=WIRING RULE,1=STAR,2=SERIAL,3=SHORTEST
*     MSWT4 - - - - -DESIGNATES ORIGIN COORDINATE FOR ASSIGN BATCHING
*                    1-MINY, 2-MINX, 3-MAXY, 4=MAX=X, 5-CENTER OF MASS
*******************************************************************
*
*******************************************************************
* INITIALIZE COMMON WORDS WITH MODE DESCRIPTIONS FROM 'DATA'      *
*******************************************************************
*
* THREE PROCESSES DEFINED - CONVERG,BLOWUP,AND GRDFIX
*INITIALIZE PROCESS WITH DATA WORDS
      PROCES(1)=RCNVRG
      PROCES(2)=RBLOW
      PROCES (3)=FIXON
      MODE(1)=MODES(1)
      MODE(2)=MODES(2)
      MODE(3)=MODES(3)
*
* INITIALIZE ALL OUTPUT LISTING COUNTERS
      LISTNT=0
      LISTPN=0
      LISTCH=0
      LISTPT=0
*
*******************************************************************
* INPUT POSITION AND NETS DATA AND PROGRAM PARAMETERS             *
*******************************************************************
*
* GET TIME AND DATE FOR OUTPUT SUMMARY
      CALL ITIME(NDAY,TIME)
* ENTER INITIAL PLACEMENT,BOARD SIZE AND TITLE FROM FILE 20
      CALL INPOSI
* ENTER INITIAL NETS DATA FROM FILE  21
      CALL INNETS
* ENTER PLACEMENT PARAMETERS FROM CARD FILE 05
      CALL PARMIN
*
*******************************************************************
* SAVE ORIGINAL SITES IN ARRAY 'SITE'                             *
* SAVE SORTED ORDER OF SUBSCRIPTS ON SITE IN ARRAY'NSITE'         *
* SORT ORDER DESIGNATED BY MSWT4:                                 *
*    (1)MINY, (2)MINX, (3)MAXY, (4)MAXY                           *
*******************************************************************
*
      DO 2 MOD=1,NFIXCY
      SITE(1,MOD)=POSITN(1,MOD)
2     SITE(2,MOD)=POSITN(2,MOD)
      KORD=1
      IF(MSWT4.EQ.1 .OR. MSWT4.EQ.3)KORD=2
* FILL ARRAY 'NPOSIT' WITH SUBSCRIPTS OF POSITNS IN ORDER MIN TO MAX
      CALL LNGSRT(KORD)
* TRANSFER ORDERED SUBSCRIPTS TO NSITES ACCORDING TO MSWT4
      IF(MSWT4.LE.2) GO TO 7
* TO HERE IF ORDER ON KORD IS MAX TO MIN
      NP=NFREE+1
      DO 8 MOD=1,NFREE
      NP=NP-1
8     NSITE(MOD)=NPOSIT(NP)
      GO TO 11
* TO '7' IF ORDER ON KORD IS MIN TO MAX
7     DO 9 MOD=1,NFREE
9     NSITE(MOD)=NPOSIT(MOD)
```

FIG. 9C

```
11    CONTINUE
*
**********************************************************************
*
* COMPUTE INITIAL CENTER OF MASS
      CALL CENTER
* SET RADIUS OF REPULSION
      PULSRD=RADIUS
* SAVE ORIGINAL REQUEST FOR NET ORDERING
      NSAVE4=NSS(4)
* NSS5 EQUAL ZERO FOR LOCATION PLOT OF PSEUDO LOCS, =1 FOR REAL LOC PLOT
      NSS(5)=1
      FRCMIN=1.01
* STOPA IS CURRENT TERMINATOR FOR ITERATIONS
      STOPA=STOP1
      NR=NRUNS
* FIND MAXIMUM NUMBER OF PINS PER NET FOR ALL NETS
      MAXNET=0
      DO 40 N=1,10
      IF(MCCNT(N).GT.0) MAXNET=N
40    CONTINUE
* MINNET IS 2 PER CENT OF TOTAL NUMBER OF NETS FOR PROGRESSIVE NET ADD
      MINNET=NUMNET*2/100
*
**********************************************************************
* START PLACEMENT PROCESS * 3 PARTS * CONVRG * BLOWUP * ASSIGN * * * * *
*     NET CONNECTION MODE CONTROLLED BY NSS4                         *
*     PHYSICAL REPULSION WITH UNRELATED NEIGHBORS ON IF NSS3=1       *
*     PROCESS INCLUDES ONLY NETS WITH LESS THAN IRG4 PINS PER NET    *
**********************************************************************
*
      DO 100  NRUNS=1,NR
      CALL ITIME(NDAY,TIME)
*
**********************************************************************
* INITIALIZE PROCESS CONTROLS FOR SUMMARY OUTPUT                     *
**********************************************************************
*
      IRG4=MAXNET
      NOWPRO=1
      NOWMOD=KINIT
* PRINT HEADING FOR CURRENT RUN
      CALL SUMMRY
      WRITE(15,200)
200   FORMAT(11H *CONVERG *,12(3X,7H...   *))
* INITIALIZE SUM COUNTERS FOR TOTAL ITERATIONS AND TOTAL REORDERS
      ITERAL=0
      LORDAL=0
      NSS(3)=1
      NOWMOD=JREPEL
      IF(NRUNS .GT. 1) GO TO 55
* SUMMARIZE INITIAL PLACEMENT
       NSS(3)=0
      NOWMOD=NOREPL
      CALL WRAP
* SAVE INITIAL VALUES OF TOTAL AND GREAT (MAXIMUM WIRE LENGTH)
      GRTIN=GREAT
      TOTAL1=TOTAL
* AUTOMATICALLY SET SCALE FACTORS FOR GRAPH PLOTS
      AM=FLOAT(MSCALE)
      ASCALE=AM/TOTAL1
      BSCALE=AM/GRTIN
*
**********************************************************************
* INITIALIZE PROCESS CONTROLS FOR:                                   *
*     STAR WIRE RULE FOR INITIAL CONDITIONING (RUN 1 ONLY)           *
*     NO REPULSIVE FORCES                                            *
**********************************************************************
```

FIG. 9D

```
      NSS(4)=1
*    ALLOW HALF THE MAXIMUM DESIRED ITERATIONS
* SINCE LENGTH INCREASE IS EXPECTED, INCREASE LIMITS ON ALLOWED INCREASES
      NTEMP=LOOP1
      LOOP1=LOOP1/2
      CALL CONVRG ($10)
 10   CONTINUE
      LOOP1=NTEMP
*
*********************************************************************
*     CONVERG WITH STAR ORDERING (NSS4) AND REPULSIVE FORCES (NSS3)    *
*********************************************************************
*
       NSS(3)=1
      NOWMOD=JREPEL
       NTEMP=INCRMX
       INCRMX=5*INCRMX
      CALL CONVRG($50)
 50   CONTINUE
       INCRMX=NTEMP
*
*********************************************************************
* COMPLETE WITH SERIAL MODE NET SEQUENCING                           *
* START PROGRESSIVE NET ADDITION BY INCLUDING ONLY NETS OF .LT. 3 PINS *
*                                                                    *
* TO THIS POINT DIRECTLY ON ALL RUNS FOLLOWING RUN 1.                 *
*********************************************************************
*
55    CONTINUE
      NSS(4)=NSAVE4
      IRG4=2
      CALL CONVRG($30)
 30   CONTINUE
      CALL ITIME(NDAY,TIME)
      CALL PLOT
*
*********************************************************************
* INCLUDE PHYSICAL CONSTRAINTS * * * BLOWUP PROCESS                  *
*********************************************************************
*
      NOWPRO=2
      WRITE(15,201)
201   FORMAT(11H * BLOWUP *,12(3X,7H...    *))
      CALL BLOWUP ($555)
 555  CONTINUE
      CALL ITIME(NDAY,TIME)
      CALL PLOT
*
*********************************************************************
* USE MUNKRE'S ASSIGNMENT ALGORITHM TO INTEGERIZE FINAL SOLUTION     *
*********************************************************************
*
      NOWPRO=3
      ITYPE=FIXON
      CALL ASSIGN
      CALL ITIME(NDAY,TIME)
*
*********************************************************************
* SUMMARIZE SOLUTION FOR THIS RUN WITH APPROPRIATE OUTPUT            *
*********************************************************************
*
      CALL WRAP
      PRCNTL=(TOTAL-TOTAL1)/TOTAL1*100.
      WRITE(15,202)
202   FORMAT(11H *GRIDFIX *,12(3X,7H...    *))
      WRITE(15,203)STOPA,PULBRD,FRAC,IRG4,ITERAL,LORDAL ,
     2 GRTIN,GREAT,TOTAL1,TOTAL,PRCNTL
203   FORMAT(1X,20H* OVERALL SUMMARY  *,E9.2,1H*,F9.3,1H*,E9.2,3(3H*
     2 I5,2X),5(1H*,F9.2),1H*/1X,130(1H*))
```

Fig. 9E

```
***************************************************************************
* END THIS RUN -REPEAT(IF DESIRED) USES THIS SOLUTION FOR INITIAL INPUT*
* DO NOT REPEAT IF LAST TWO RUNS DID NOT DIFFER IN MAX AND TOTAL LENGTH*
***************************************************************************
*
      DGRT=ABS(GRTIN-GREAT)/GRTIN
      IF(ABS(PRCNTL) ,LE, ,10 ,AND, DGRT,LE,0,01) GO TO 4999
  100 CONTINUE
4999   CONTINUE
      RETURN
      END
85 WORDS OF MEMORY USED BY THIS COMPILATION
```

FIG. 9F

```
C CONVRG    SCANLON SUBROUTINE CONVRG  OVLY2
C              CONTROLS PROCESS OF ATTRACTION
      SUBROUTINE CONVRG (*)
*
      COMMON LET(21),NETS(1000,11),NETWHT(1000),NUMNET,POSITN(2,300),
     1       SITE(2,300),NSITE(300),ITABLE(300),LBAR(300),NFREE,NFIX,
     2       NFIXCX,NFIXCY,TOTAL,GREAT,FRAC,FRAC1,FRAC2,STOPA,STOP1,
     3       STOP2,XCENT,YCENT,XAVE,YAVE,LOOP1,LOOP2,RADIUS,NRUNS,
     4       NSS(5),INCRMX,NRORD,IXTRA,ARG1,RMIN,ASCALE,BSCALE,IRG1,
     5       IRG2,IRG3,IRG4,MSCALE,NPRNT,TOTAL1,RPRADI,NCHANG,ITERAL,
     6       LORDAL,RADIY,NAVER,NPX,NNX,NPY,NNY,
     7       VECTOR(2,300),XPLIST(100),XNLIST(100),YPLIST(100),
     8       YNLIST(100),PHYSCL(2,300),KONEX(300,100),Y(2,400),
     9       NKONEX(300),NPOSIT(300)
      COMMON/TITLE/ NTITLE (3),LISTNT,LISTPN,LISTCH,LISTPT,MODE(3)
      COMMON/TITLE/ NDAY,TIME
      COMMON/BOARD/BDESIR(2),SDESIR(2),DIMENX,DIMENY,PITCHY
      COMMON /STATE/ PROCES(3),NOWPRO,ITSAVE,NOWMOD
      COMMON /SCN/ MMODL,MMODF,MPEF(11),MCNET(21)
      COMMON /SCN/ IPEF,ICNET,ITR
      COMMON /SCN/ IWERR,IERR,IOERR
      COMMON /SCN/ MCCNT(14),MAXNET,MINNET
       DIMENSION TSAVE(5)
      EQUIVALENCE(AVEVEC,XPLIST(1))
      DATA NSTAR,NSTRNG/6H  STAR,6HSERIAL/
      DATA LINE,ISKR/6H* * * ,1H*/
*
************************************************************************
* THIS ROUTINE ITERATIVELY MOVES EACH MODULE ACCORDING TO THE ELECTRIC *
* FORCES ON THE MODULE UNTIL A STABLE LAYOUT IS ACHIEVED              *
************************************************************************
*
* SELECT CONVERGENCE MODE / PRINT TITLE
      PULSRD=RPRADI
      IF(NSS(3).EQ.0) PULSRD= 0.
      NEXTRA=0
      NTYPE=NSS(4)
      ITYPE=MODE(NTYPE)
      IF(NPRNT.EQ.0) GO TO 1
      PRINT 60,NTITLE,NDAY,TIME,NRUNS,NOWMOD
      PRINT 5,LINE,LINE,ISKR,ISKR,ITYPE,ISKR,ISKR,LINE,LINE
*
1     CONTINUE
* FRAC IS CURRENT MOBILITY FACTOR
      FRAC=FRAC1
      NETCHG=0
      TOTIN=TOTAL
      GRTIN=GREAT
      LESAVG=1
      JPLT=0
      JORDER=0
      KPLOT=0
      JTRU=0
      INCRS=0
      IHIEST=LOOP1/10*2
      OLDTOT=1.E10
      OLDMAX=1.E10
      IF(NPRNT.EQ.1) PRINT 11,IRG4
* INITIALIZE CONNECTION MATRIX 'KONEX' WITH NET ORDERING ROUTINES
      IF(NTYPE .EQ.1) CALL PATCH
      IF(NTYPE .EQ.2) CALL SERIAL
      IF(NTYPE .EQ.3) CALL SHRTST
      IF(NTYPE.LE.2) NETCHG=NETCHG+1
      NRORD=2
       DO 2 J=1,NAVER
2      TSAVE(J)=0
       AVERG=0.
       AVTOT=0.
       JAVER=1
```

FIG. 10A

```
      CALL CENTER
*
**********************************************************************
* ENTER CONVERGE LOOP FOR CURRENT NETS INCLUDED IN CALCULATIONS.     *
**********************************************************************
*
      DO 100 J=1,LOOP1
      JSAVE=J
      ITSAVE=J
* TIME TO REORDER NETS
      IF(NSS(4).EQ.1) GO TO 9092
      IF(IRG4.LE.2) GO TO 9092
      JORDER=JORDER+1
      IF(NRORD .GT. 0) GO TO 9092
      IF(NTYPE .EQ.1) CALL PATCH
      IF(NTYPE .EQ.2) CALL SERIAL
      IF(NTYPE .EQ.3) CALL SHRTST
      JORDER=0
      IF(NTYPE.LT.3) GO TO 9089
      NETCHG=NCHANG
      GO TO 9092
9089  NETCHG=NETCHG+NCHANG
 9092 CONTINUE
*
**********************************************************************
* COMPUTE NEW POSITIONS FOR THIS ITERATION WITH FOLLOWING ROUTINE CALLS*
**********************************************************************
*
      CALL CALSRT
       IF(NSS(3) .EQ. 0) GO TO 3
      CALL REPULS
3      CONTINUE
      CALL MOVE
*
* COMPUTE AVERAGE TOTAL LINE LENGTH FOR LAST JAVER ITERATIONS
      DT=TOTAL-OLDTOT
      DG=GREAT-OLDMAX
      PRCTDT=100.*ABS (OLDTOT-TOTAL)/OLDTOT
      OLDTOT=TOTAL
      OLDMAX=GREAT
       AVTOT=AVTOT-TSAVE(JAVER)+TOTAL
       TSAVE(JAVER)=TOTAL
       AVERG=AVTOT/FLOAT(NAVER)
       JAVER=JAVER+1-(JAVER/NAVER)*NAVER
      DAVER=AVERG-TOTAL
* LESAVG IS FLAG TO INSURE THAT TOTAL(CURRENT) APPROACHES AVERAGE
* FROM BELOW (INDICATING A CONVERGING, STABLE CONDITION)
      IF(DAVER .GT. 0.) LESAVG=0
      IF(NPRNT.EQ.1) PRINT 20,TOTAL,GREAT,AVEVEC,ARG1,IXTRA,FRAC
*
* AUTOMATICALLY ADJUST NRORD FOR FREQUENCE OF NET REORDERING
      IF(NRORD .GT. 0 ) GO TO 4
      NRORD=IFIX( 0.25*(ABS(PRCTDT) -6.0)**2) + 1
      IF(ABS(PRCTDT) .GT. 6.0) NRORD=1
4     CONTINUE
      NRORD=NRORD-1
* TIME TO PLOT LOCATION PLOT
      KPLOT=KPLOT+1
      IF(KPLOT.LT.IRG2) GO TO 9090
      CALL PLOT
      IF(NPRNT.EQ.1) PRINT 3020,LISTPT
      KPLOT=0
9090  CONTINUE
* TIME TO SEND DATA POINT TO GRAPH PLOTTER ARRAY
      JPLT=JPLT+1
      IF(JPLT.LT. IRG3) GO TO 9091
      JPLT=0
      JTRU=JTRU+1
```

FIG. 10B

FIG-10C

```
      Y(1,JTRU)=TOTAL*ASCALE
      Y(2,JTRU)=BSCALE*GREAT
 9091 CONTINUE
*
*****************************************************************
* EVALUATE HOW PROCESS IS CONVERGING * CHECK STOPPING CRITERIA  *
* STOP IF CURRENT TOTAL IS WITHIN'STOPA' OF AVERAGE TOTAL FOR   *
* LAST NAVER ITERATIONS                                          *
*****************************************************************
*
      IF(J.LT.NAVER) GO TO 100
      IF(DT.GT.0.) GO TO 80
      INCRS=0
106   RSTOP=STOPA*TOTAL
      IF(DAVER.GT.RSTOP) GO TO 100
* LESAVG INITIALLY =1, INDICATING PAST AVERAGE TOTAL LENGTH LESS
* THAN CURRENT TOTAL -- LESAVG=0 TO INDICATE THAT PAST
* AVERAGE TOTAL IS APPROACHING TOTAL FROM ABOVE
      IF(LESAVG .EQ. 1) GO TO 100
* OUTPUT AND LOOP EXIT HERE MEANS SUCCESSFUL CONVERGE PROCESS COMPLETE
      IF(NPRNT.EQ.0) PRINT 60,NTITLE,NDAY,TIME,NRUNS,NOWMOD
      PRINT 200,J
      GO TO 108
   80 INCRS=INCRS+1
*                                      CHECK IF TOTAL DIVERGING TOO OFTEN
      IF(INCRS.LT.INCRMX) GO TO 106
      PRINT 201,INCRS
      IF(INCRS .GE. IHIEST) GO TO 105
      GO TO 106
  100 CONTINUE
* OUTPUT AND LOOP EXIT HERE IF MAXIMUM ITERATIONS USED BEFORE STABILITY
      IF(NPRNT.EQ.0) PRINT 60,NTITLE,NDAY,TIME,NRUNS,NOWMOD
      PRINT 202,LOOP1
      GO TO 108
* OUTPUT AND LOOP EXIT HERE FOR CONVERG ABORT DUE TO DIVERGING LENGTH
105   IF(NPRNT.EQ.0) PRINT 60,NTITLE,NDAY,TIME,NRUNS,NOWMOD
      PRINT 204
108   CONTINUE
      CALL RECNTR
      CALL DISTP
      PRINT 205,TOTAL,GREAT,XCENT,YCENT,IRG4,ITYPE
      LORDAL=LORDAL + NETCHG
      ITERAL=ITERAL+JSAVE
      PRCNTL=(TOTAL-TOTIN)/TOTIN*100.
      WRITE(15,3000)ITYPE,STOPA,PULSRD,FRAC,IRG4,JSAVE,NETCHG,
     2 GRTIN,GREAT,TOTIN,TOTAL,PRCNTL
* IGNORE REQUEST FOR GRAPH PLOT IF FEWER THAN 10 POINTS ARE IN BUFFER
      IF(JTRU .LT. 10) PRINT 301
      IF(JTRU.LT.10) GO TO 109
      IF(NPRNT.EQ.1) PRINT 60,NTITLE,NDAY,TIME,NRUNS,NOWMOD
      PRINT 901,ASCALE,BSCALE
      CALL PLOTG(2,JTRU,MSCALE)
109   CONTINUE
      IF(IRG1.EQ.0) RETURN
* IRG4 IS COUNTER FOR PROGRESSIVE NET ADDITION
* IGNORE ADDITIONAL CONVERG CYCLES FOR ADDITION OF NETS WITH LESS THAN
* 2 PER CENT INFLUENCE ON TOTAL NUMBER OF NETS
110   IRG4=IRG4+1
      IF(MCCNT(IRG4).LE.MINNET .AND. IRG4.NE.MAXNET) GO TO 110
      GO TO 1
*
*****************************************************************
    5 FORMAT(////,14X,2A6,/,14X,A1,9X,A1,/, 16HCONVERGE WITH * ,
     2 A6,2X,23H* TYPE INTERCONNECTIONS,/,14X,A1,9X,A1,/,14X,2A6,///)
11    FORMAT(1H0,9X,5HTOTAL,15X,5HGREAT,10X,10HAVE.VECTOR,10X,
     210HMAX VECTOR,5X,4HWILD,6X,8HMOBILITY,
     &          3X,13HUSING NETS OF,I4,13H OR LESS PINS//)
20    FORMAT(F15.6,5X,F15.6,5X,F15.6,5X,F15.6,5X,I3,5X,1PE10.3)
60    FORMAT(8H1TITLE* ,3A6,10X,5HDATE ,A6,8H, TIME= ,F6.2,10X,
```

```
     2  10HRUN NUMBER,I3,5X,17HCURRENT PHASE IS ,A6//)
 98   FORMAT(33H0* * * * * * * PLOT FOR ITERATION,I5)
99    FORMAT (1X,7HCENTER ,F8.3,1X,F8.3,5X, 7HAVERAGE ,1X,F8.3,1X,F8.3,
     15X,6HTOTAL ,F8.3,        5X,8HMAXIMUM ,F8.3)
  201 FORMAT(19H ** TOTAL INCREASED,I5, 6H TIMES)
200   FORMAT(//,1X,60(1H*),/27H STABLE LAYOUT ON ITERATION,I5)
202   FORMAT(//,1X,60(1H*),/26H NO STABLE LAYOUT FOUND IN,I5,11H ITERATI
     1ONS)
204   FORMAT(//,1X,60(1H*),/38H TOTAL INCREASED TOO MANY TIMES - STOP)
205   FORMAT(12H TOTAL WIRE=,F15.6/21H MAXIMUM WIRE LENGTH=,F15.6/
     1 18H CENTER OF MASS AT,2F15.6,/12H FOR NETS OF,I3,13H OR LESS PINS
     2 /1X,A6,16H TYPE NET WIRING/1X,60(1H*)//)
301   FORMAT(32H NO PLOT FOR LESS THAN 10 POINTS)
901   FORMAT(13H PLOT OF (A) ,F9.3,15H*TOTAL, AND (B),F9.3,5H*LMAX//)
3000  FORMAT(1X,1H*,8X,3H*  ,A6,2H *,E9.2,1H*,F9.3,1H*,E9.2,3(3H*  ,I5,
     2 2X),5(1H*,F9.2),1H*)
3020  FORMAT(1H*,80X,4HPLOT,I4)
*************************************************************************
*
      END

07 WORDS OF MEMORY USED BY THIS COMPILATION
```

FIG. 10D

```
C BLOWUP    SCANLON SUBROUTINE BLOWUP  OVLY2
C                CONTROLS REDUCTION OF OVERLAP
      SUBROUTINE BLOWUP(*)
*
      COMMON LET(21),NETS(1000,11),NETWHT(1000),NUMNET,POSITN(2,300),
     1        SITE(2,300),NSITE(300),ITABLE(300),LBAR(300),NFREE,NFIX,
     2        NFIXCX,NFIXCY,TOTAL,GREAT,FRAC,FRAC1,FRAC2,STOPA,STOP1,
     3        STOP2,XCENT,YCENT,XAVE,YAVE,LOOP1,LOOP2,RADIUS,NRUNS,
     4        NSS(5),INCRMX,NRORD,IXTRA,ARG1,RMIN,ASCALE,BSCALE,IRG1,
     5        IRG2,IRG3,IRG4,MSCALE,NPRNT,TOTAL1,RPRADI,NCHANG,ITERAL,
     6        LORDAL,RADIY,NAVER,NPX,NNX,NPY,NNY,
     7        VECTOR(2,300),XPLIST(100),XNLIST(100),YPLIST(100),
     8        YNLIST(100),PHYSCL(2,300),KONEX(300,100),Y(2,400),
     9        NKONEX(300),NPOSIT(300)
      COMMON/TITLE/ NTITLE (3),LISTNT,LISTPN,LISTCH,LISTPT,MODE(3)
      COMMON/TITLE/ NDAY,TIME
      COMMON/BOARD/BDESIR(2),SDESIR(2),DIMENX,DIMENY,PITCHY
      COMMON/STATE/ PROCES(3),NOWPRO,ITSAVE,NOWMOD
      DIMENSION TSAVE(5)
      EQUIVALENCE (OVERLP,XPLIST(2))
      EQUIVALENCE (AVEVEC,XPLIST(1))
      DATA NOBOND,INBOND/6H FREE ,6HBORDER/
*
*************************************************************************
* THIS ROUTINE CONTROLS THE REDUCTION OF OVERLAP AND ASSOCIATED OUTPUT *
* ROUTINE DESIRES TO REDUCE PHYSICAL OVERLAP OF ELEMENTS BY            *
* PUSHING THEM APART TO A PHYSICAL RADIUS THAT DESCRIBES EACH MODULES  *
* PHYSICAL SIZE. TWO MODES OF EXPANSION ARE (1)UNRESTRICTED SPACE AND  *
* (2) MODULES CONFINED TO PHYSICAL BOARD AREA, BOTH THESE PROCESS ARE  *
* ITERATIVE (AS CONVERG) AND ALLOW FOR NET REORDERING.                 *
* INTENT IS TO CONDITION FREE SPACE LAYOUT SO THAT SIMPLE COORDINATE   *
* SORT CAN BE USED TO INTEGERIZE FINAL PLACEMENT (SEE GRDFIX) ON GRID  *
*                                                                      *
*************************************************************************
*
*
      IRG2=1
* INITIALIZE PARAMETERS
      NRORD=5
      RADSTP= AMIN1(DIMENX,DIMENY) * .9
      PULSRD= AMAX1(DIMENX,DIMENY)
* SET REPULS TO SINGLE MODULE SIZE FOR BLOWUP
      REPULI=RPRADI
      RPRADI=2.0*PULSRD
      RSCALE=FLOAT(MSCALE)/RADIUS
      RAD8=.8*RADIUS
      RAD9=.9*RADIUS
* KORD SETS TYPE OF BOUNDARY USED IN BOUNDED BLOWUP
*     KORD=1 FOR X BORDERS ONLY (FROM LEFT AND RIGHT)
*     KORD=2 FOR Y BORDERS ONLY (FROM TOP AND BOTTOM)
*     KORD.GE.3 FOR ALL FOUR SIDES
      KORD=4
*
*************************************************************************
* DO UNBOUNDED BLOWUP FOR INITIAL CONDITIONING IN BLOWUP               *
*************************************************************************
*
*
      LOOPX=LOOP2
      BSCALO=BSCALE
      ASCALO=ASCALE
      ASCALE=100.
      JTRU=0
      ITYPE=NOBOND
  250 CONTINUE
      IF(NPRNT .EQ. 0) GO TO 251
      NOWMOD=ITYPE
      PRINT 60,NTITLE,NDAY,TIME,NRUNS,NOWMOD
      PRINT 990,ITYPE,RADSTP,
```

FIG. 11A

```
251   CONTINUE
* INITIALIZE PARAMETERS
      NETCHG=0
      TOTIN=TOTAL
      GRTIN=GREAT
      JPLT=0
      JPLOT=0
      JORDER=0
      DO 321 J=1,NAVER
321   TSAVE(J)=0.
      AVERG=0.
      AVTOTL=0.
      JAVER=1
*************************************************************************
*                                                                       *
* START BLOWUP LOOP                                                     *
*                                                                       *
*************************************************************************
      DO 100 J=1,LOOPX
      JSAVE=J
      ITSAVE=J
      DO 1 IV=1,NFIXCY
      VECTOR(1,IV)=0.0
1     VECTOR(2,IV)=0.0
* TIME TO REORDER NETS
      JORDER=JORDER +1
      IF(JORDER .LT. NRORD) GO TO 10
      JORDER=0
      IF(NSS(4).EQ.1) CALL PATCH
      IF(NSS(4).EQ.2) CALL SERIAL
      IF(NSS(4).EQ.3) CALL SHRTST
      IF (NSS(4) .LT. 3) GO TO 9089
      NETCHG=NCHANG
      GO TO 10
 9089 NETCHG=NETCHG+NCHANG
 10   CONTINUE
* INITIALIZE PHYSICAL VECTORS
      DO 2 K=1,NFIXCY
      PHYSCL(1,K)=0.0
2     PHYSCL(2,K)=0.0
      IF(ITYPE.NE.INBOND) GO TO 300
* APPLY BOUNDARY FORCES TO INITIALIZE 'PHYSCL' IF IN BOUNDED MODE
      CALL BOUNDS($320,KORD)
* NORMAL EXIT INDICATES BOUNDARIES NOT SATISFIED
300   CONTINUE
* COMPUTE PHYSICAL OVERLAP FORCES
      CALL BLOW
* COMPUTE TOTAL LINE LENGTH FOR THIS ITERATION
      CALL DISTP
*  COMPUTE AVERAGE LENGTH FOR LAST JAVER ITERATIONS
      AVTOTL=AVTOTL + OVERLP -TSAVE(JAVER)
      TSAVE(JAVER)=OVERLP
      AVERG=AVTOTL/FLOAT(NAVER)
      JAVER=JAVER + 1 -(JAVER/NAVER)*NAVER
      DAVER=AVERG-OVERLP
*   TIME FOR LOCATION PLOT
      JPLOT=JPLOT + 1
      IF(JPLOT.LT.IRG2) GO TO 9090
      CALL PLOT
      IF(NPRNT.EQ.1) PRINT 3020,LISTPT
      JPLOT=0
9090  CONTINUE
* TIME TO SEND DATA TO GRAPH PLOTTER ARRAY
      JPLT=JPLT+1
      IF(JPLT.LT.IRG3) GO TO 900
      JPLT=0
      JTRU=JTRU+1
      IF(JTRU.EQ.1) BSCALE=FLOAT(MSCALE)/OVERLP
      Y(1,JTRU)=ASCALE*RMIN
```

FIG-11B

FIG. 11C

```
      Y(2,JTRU)=BSCALE*OVERLP
900   CONTINUE
*
* CHECK FOR ZERO OVERLAP (TERMINATING CONDITION)
      IF(ITYPE .EQ. INBOND .AND. JSAVE .LT. 5) GO TO 30
       IF(RMIN.GE. RADSTP) GO TO 50
*  RELOCATE MODULES ACCORDSING TO VECTORS
   30 CALL MOVE
      IF(NPRNT.EQ.1) PRINT 1000,RMIN,TOTAL,GREAT,OVERLP,AVERG,DAVER
     2,AVEVEC,ARG1,FRAC
 100  CONTINUE
* NORMAL EXIT FROM 'DO 100' MEANS DID NOT FIND ZERO OVERLAP
      PRINT 500
 50   CONTINUE
320   CONTINUE
*
*************************************************************************
*
* SUMMARIZE BLOWUP PROCESS FOR THIS PHASE                               *
*                                                                       *
*************************************************************************
      CALL DISTP
      PRINT 502,RMIN,JSAVE,TOTAL,GREAT,RMIN
      LORDAL=LORDAL + NETCHG
      ITERAL=ITERAL+JSAVE
      PRCNTL=(TOTAL-TOTIN)/TOTIN*100.
      WRITE(15,3000)ITYPE,STOPA,PULSRD,FRAC,IRG4,JSAVE,NETCHG,
     2 GRTIN,GREAT,TOTIN,TOTAL,PRCNTL
      CALL RECNTR
      TOTIN=TOTAL
      CALL DISTP
      WRITE(15,3012)TOTIN,TOTAL
3012  FORMAT(2H *,8X,11H* RECENTER*,8(3X,7H...    *),2(F9.2,1H*),3X,
     2 7H...    *)
*
*************************************************************************
* REPEAT FOR BOUNDED CASE BEFORE RETURN                                 *
*************************************************************************
*
      IF(ITYPE .EQ. INBOND) GO TO 6000
*
*************************************************************************
* SUMMARIZE ENTIRE BLOWUP PROCESS                                       *
*************************************************************************
*
      CALL ITIME(NDAY,TIME)
      CALL PLOT
      ITYPE=INBOND
      LOOPX=LOOP2
      GO TO 250
6000  CONTINUE
      ASCALE=ASCALO
      BSCALE=BSCALO
*  RESET REPULSE RADIUS TO NORMAL
      RPRADI=REPULI
* IGNORE REQUEST FOR GRAPH PLOT IF FEWER THAN 10 POINTS ARE IN BUFFER
      IF(JTRU .LT. 10) PRINT 301
      IF(JTRU .LT.10) RETURN
      PRINT 60,NTITLE,NDAY,TIME,NRUNS,NOWMOD
      PRINT 901,ASCALE,BSCALE
      CALL PLOTG(2,JTRU,MSCALE)
      RETURN
*
*************************************************************************
60    FORMAT(8H1TITLE= ,3A6,10X,5HDATE ,A6,8H, TIME= ,F6.2,10X,
     2  10HRUN NUMBER,I3,5X,17HCURRENT PHASE IS ,A6//)
301   FORMAT(32H NO PLOT FOR LESS THAN 10 POINTS)
500   FORMAT(51H0* * * * * DID NOT BLOW UP SUCCESSFULLY * * * * * *//)
502   FORMAT(20H0ALL RADII AT LEAST ,F7.3,13H ON ITERATION,I5,/
```

```
      2  7H TOTAL=,F15,6/9H MAXIMUM=,F13.6/9H MINIMUM=,F13.6)
990    FORMAT(  // 19X, 6(2H* )/19X,1H*,9X,1H*/20H B L O W U P  WITH *,
      11X,A6,26H  * MODE, ** RADIUS TO BE ,F6.2/19X,1H*,9X,1H*/
      219X, 6(2H* )///
      3 59H CLOSEST   TOTAL   LONGEST   TOTAL    AVERAGE   AVE-TOT
      4 28HAVERAGE   MAXIMUM   MOBILITY/
      5 59H MODULES    WIRE     WIRE    OVERLAP   OVERLAP   OVERLAP
      6 28HVECTOR    VECTOR    FACTOR  //)
901    FORMAT(13H PLOT OF (A) ,F9,3,29H*MINIMUM SEPARATION, AND (B) ,
      2 F9,3,14H*TOTAL OVERLAP//)
1000   FORMAT(F7.3,F10,2,F9.2,5(F10.3),1PE11.3)
3000   FORMAT(1X,1H*,8X,3H*  ,A6,2H *,E9.2,1H*,F9,3,1H*,E9.2,3(3H*  ,I5,
      2 2X),5(1H*,F9,2),1H*)
3010   FORMAT(2H *,8X,11H* RECENTER*,11(3X,7H..;   *))
3020   FORMAT(1H+,119X,5H PLOT,I4)
       END

79 WORDS OF MEMORY USED BY THIS COMPILATION
```

FIG. 11D

```
C CALSRT    SCANLON SUBROUTINE CALSRT  OVLY2
C                COMPUTE ELECTRICAL ATTRACTIONS
      SUBROUTINE CALSRT
*
      COMMON LET(21),NETS(1000,11),NETWHT(1000),NUMNET,POSITN(2,300),
     1        SITE(2,300),NSITE(300),ITABLE(300),LBAR(300),NFREE,NFIX,
     2        NFIXCX,NFIXCY,TOTAL,GREAT,FRAC,FRAC1,FRAC2,STOPA,STOP1,
     3        STOP2,XCENT,YCENT,XAVE,YAVE,LOOP1,LOOP2,RADIUS,NRUNS,
     4        NSS(5),INCRMX,NRORD,IXTRA,ARG1,RMIN,ASCALE,BSCALE,IRG1,
     5        IRG2,IRG3,IRG4,MSCALE,NPRNT,TOTAL1,RPRADI,NCHANG,ITERAL,
     6        LORDAL,RADIY,NAVER,NPX,NNX,NPY,NNY,
     7        VECTOR(2,300),XPLIST(100),XNLIST(100),YPLIST(100),
     8        YNLIST(100),PHYSCL(2,300),KONEX(300,100),Y(2,400),
     9        NKONEX(300),NPOSIT(300)
*
*************************************************************************
*                                                                       *
*  THIS ROUTINE CALCULATES VECTOR, VECTOR IS AN ARRAY THAT CONTAINS THE*
*  MAGNITUDE AND DIRECTION OF MOVEMENT FOR THE POINTS IN POSITN.        *
*                                                                       *
*                                                                       *
*  A MODULE HAS A NON-ZERO VALUE IN VECTOR ONLY IF MOVEMENT IN THE      *
*  DIRECTION SPECIFIED BY VECTOR WILL SHORTEN THE TOTAL WIRE LENGTH,    *
*  THIS IS ASSUMING ALL OTHER MODULES ARE NOT MOVING.                   *
*                                                                       *
*  THIS IS ACCOMPLISHED BY FILLING FOUR LISTS FOR EACH MODULE AND TWO   *
*  FOR EACH PIN ON A CONNECTOR. THE LISTS CONTAIN DISPLACEMENTS FROM    *
*  THE POINT WE ARE CONSIDERING TO EACH POINT CONNECTED TO IT. (A       *
*  POINT IS A MODULE OR CONNECTOR PIN) XPLIST CONTAINS THE DISPLACEMENT*
*  TO ALL CONNECTING POINTS WITH A LARGER X COORDINATE.   XNLIST        *
*  CONTAINS THE DISPLACEMENT TO ALL CONNECTING POINTS WITH A SMALLER    *
*  X COORDINATE. YPLIST AND UNLIST CONTAIN THE SAME INFORMATION FOR     *
*  THE Y DIRECTION.  NPX, NPY, NNX, AND NNY ARE COUNTS OF ENTRYS IN     *
*  THE CORRESPONDING LISTS. THE ROUTINES SORTX AND SORTY THEN PROCESS   *
*  THE LISTS TO DETERMINE VECTOR.                                       *
*                                                                       *
* USES DECISION MATRIX FOR MODULE TYPES AND LBAR LOGIC.                 *
*                                                                       *
*****************************************************************
*
      TOTAL=0.0
      GREAT=0.0
        NFRAC=0
*
*************************************************************************
*  FIND VECTOR FOR MODULES                                              *
*************************************************************************
*
      DO 1   LOC1=1,NFIXCY
      VECTOR(1,LOC1)=0.0
      VECTOR(2,LOC1)=0.0
      LINK=NKONEX(LOC1)
      IF(LINK.EQ.0) GO TO 1
      LBAR1=LBAR(LOC1)
* INITIALIZE POSITIVE AND NEGATIVE COUNTERS
      NPX=0
      NNX=0
      NPY=0
      NNY=0
      DO  2  N=1,LINK
      LOC2=KONEX(LOC1,N)
      LBAR2=LBAR(LOC2)
      XD=POSITN(1,LOC2)-POSITN(1,LOC1)
      YD=POSITN(2,LOC2)-POSITN(2,LOC1)
      VMX=1.0
      VMY=1.0
* IGNORE PARALLEL CONNECTIONS TO BAR TYPES
      GO TO ( 10,11,12),LBAR1
10    GO TO (13,11,12),LBAR2
```

FIG. 12A

```
11     YD=0.0
       GO TO 13
12     XD=0.0
13     ABDIST=ABS(XD)+ABS(YD)
       TOTAL=TOTAL+ABDIST
       IF(ABDIST.GT.GREAT) GREAT=ABDIST
* ENTER MATRIX TO DETERMINE CLASS OF EACH MODULE
       IF(LOC1.LE.NFREE .AND. LOC2.LE.NFREE) GO TO 600
       IF(LOC1.GT.NFREE) GO TO 90
* TO HERE IF LOC1 IS FREE BUT LOC2 IS NOT
       IF(LOC2.LE.NFIX) GO TO 50
       IF(LOC2.LE.NFIXCX) GO TO 60
70     VMY=2.0
       GO TO 600
90     IF(LOC1.LE.NFIX) GO TO 50
       IF(LOC1.LE.NFIXCX) GO TO 95
* TO HERE IF LOC1 IS FIXED-Y
       IF(LOC2.LE.NFREE) GO TO 70
       IF(LOC2.LE.NFIXCX) GO TO 50
       GO TO 600
* TO HERE IF LOC1 IS FIXED-X
95     IF(LOC2.GT.NFREE) GO TO 97
* TO 60 FOR FREE-FIX-X COMBINATION
60     VMX=2.0
       GO TO 600
97     IF(LOC2.LE.NFIX) GO TO 50
       IF(LOC2.LE.NFIXCX) GO TO 600
50     VMX=2.0
       VMY=2.0
600    CONTINUE
       X=VMX*XD
       Y=VMY*YD
*
*********************************************************************
*                                                                   *
*  IF TWO POINTS COME WITHIN STOP2 OF EACH OTHER, THE CONNECTION    *
*  BETWEEN THEM IS IGNORED.                                         *
*                                                                   *
*********************************************************************
*
       IF (ABS(Y).LT.STOP2) GO TO 4
       IF(Y.LT.0.)GO TO 3
       NPY=NPY+1
       YPLIST(NPY)=Y
       GO TO 4
3      NNY=NNY+1
       YNLIST(NNY)=Y
4      IF (ABS(X).LT.STOP2) GO TO 2
       IF(X.LT.0.)GO TO 5
       NPX=NPX+1
       XPLIST(NPX)=X
       GO TO 2
5      CONTINUE
       NNX=NNX+1
       XNLIST(NNX)=X
2      CONTINUE
       VECTOR (1,LOC1)=SORTX(0.0)
       VECTOR (2,LOC1)=SORTY(0.0)
1      CONTINUE
       TOTAL=TOTAL*.5
       RETURN
       END
```

FIG-12B

```
63 WORDS OF MEMORY USED BY THIS COMPILATION

        LBL     SORTVC
        TTL     SCANLON SUBROUTINE SORTVC  OVLY2
 **********************************************************************
```

```
*
*   THIS MACRO SORTS #1 HIGHEST ORDER VALUES OUT OF #2 VALUES AND ZEROS *
*   THEM. THE REMAINDER ARE SUMMED UP. IF #4 IS TMI IT IS THE LIST WITH *
*   THE NEGATIVE VALUES.
*                                                                        *
************************************************************************
*

SRT      MACRO    #1,#2,#3,#4,#5
         EAX#1    -1,#1          SUB 1 FROM THE NO TO BE SORTED
         TMI      #12            IF NONE TO SORT GO SEE IF LIST IS EMPTY
#7       EAX5     -1,#2           PUT THE NO IN THE LIST IN X5
         TMI      #10            IF NONE IN LIST LOAD ZERO AND RETURN
         LDX4     0,DU           X4 IS THE POINTER TO THE LARGEST VALUE
         FLD      #3             ASSUME FIRST IN LIST IS THE LARGEST
#9       FCMP     #3,5           IS IT
         #4       #6,$           YES GO ON
         FLD      #3,5           NO, ONE JUST CMPAED IS NOW LARGEST
         EAX4     0,5            SET PTR TO LARGEST
#6       EAX5     -1,5           TRY NEXT ONE IN LIST
         TPL      #9,$           GO ON
         LDA      =0400000,DU    LDA WITH FLOATING PT ZERO
         STA      #3,4           ZERO THE MAX
         EAX#1    -1,#1          ONE LESS MAX TO FIND
         TPL      #7,$           AGAIN
#11      EAX#2    -1,#2          GET READY TO ADD
         FLD      ZERO
#8       FAD      #3,#2          ADD UP LIST
         EAX#2    -1,#2          DECR CNT
         TPL      #8,$           GO ON
         RETURN   #5             RETURN, ALL IS WELL
#12      CMPX#2   0,DU           IS THE LIST OF ZERO LENGTH
         TNZ      #11            NO,  GO FIND THE SUM OF THE LIST
#10      FLD      ZERO           THERE ARE NO ENTRYS IN THE LIST, SUM = ZERO
         RETURN   #5
         ENDM     SRT
*
***********************************************************************
*                                                                     *
*   THIS ROUTINE TAKES NNX AND NPX AND DECIDES WHICH IS LARGEST. THE  *
*   LIST CORRESPONDING TO THE LARGEST COUNT IS SORTED AND THEN THE    *
*   SMALLER COUNT SPECIFIES HOW MANY HIGH ORDER ENTRYS ARE ZEROED. THE *
*   SUM OF THE LIST IS THEN FOUND AND RETURNED.                       *
*                                                                     *
***********************************************************************
*
SORTX    SAVE     7,6,5,4
         LDA      NPX
         EAX7     0,AL
         LXL6     NNX
         CMPA     NNX          ARE THERE MORE NEG
         TMI      NEG              YES SORT NEG LIST
         SRT      6,7,XPLIST,TPL,SORTX
         EAX6     -1,6
         TMI      ,007.
 .002.   EAX5     -1,7
         TMI      ,005.
         LDX4     0,DU
         FLD      XPLIST
 .004.   FCMP     XPLIST,5
         TPL      ,001.,$
         FLD      XPLIST,5
         EAX4     0,5
 .001.   EAX5     -1,5
         TPL      ,004.,$
         LDA      =0400000,DU     LDA WITH FLOATING PT ZERO
         STA      XPLIST,4
         EAX6     -1,6
         TPL      ,002.,$
```

FIG. 12C

```
   .006.  EAX7    -1,7
          FLD     ZERO
   .003.  FAD     XPLIST,7
          EAX7    -1,7
          TPL     ,003.,$
          RETURN  SORTX
   .007.  CMPX7   0,DU
          TNZ     ,006.
   .005.  FLD     ZERO
          RETURN  SORTX
59 NEG    SRT     7,6,XNLIST,TMI,SORTX
          EAX7    -1,7
          TMI     ,014.
   .009.  EAX5    -1,6
          TMI     ,012.
          LDX4    0,DU
          FLD     XNLIST
   .011.  FCMP    XNLIST,5
          TMI     ,008.,$
          FLD     XNLIST,5
          EAX4    0,5
   .008.  EAX5    -1,5
          TPL     ,011.,$
          LDA     =0400000,DU     LDA WITH FLOATING PT ZERO
          STA     XNLIST,4
          EAX7    -1,7
          TPL     ,009.,$
   .013.  EAX6    -1,6
          FLD     ZERO
   .010.  FAD     XNLIST,6
          EAX6    -1,6
          TPL     ,010.,$
          RETURN  SORTX
   .014.  CMPX6   0,DU
          TNZ     ,013.
   .012.  FLD     ZERO
          RETURN  SORTX
60 *
61 ***********************************************************************
62 *                                                                     *
63 *  THIS ROUTINE TAKES NNY AND NPY AND DECIDES WHICH IS LARGEST, THE   *
64 *  LIST CORRESPONDING TO THE LARGEST COUNT IS SORTED AND THEN THE     *
65 *  SMALLER COUNT SPECIFIES HOW MANY HIGH ORDER ENTRYS ARE ZEROED. THE *
66 *  SUM OF THE LIST IS THEN FOUND AND RETURNED.                         *
67 *                                                                     *
68 ***********************************************************************
69 *
70 SORTY  SAVE    7,6,5,4

71        LDA     NPY
72        EAX7    0,AL
73        LXL6    NNY
74        CMPA    NNY
75        TMI     NOG
76        SRT     6,7,YPLIST,TPL,SORTY
          EAX6    -1,6
          TMI     ,021.
   .016.  EAX5    -1,7
```

FIG. 12D

```
                TMI      ,019.
                LDX4     0,DU
                FLD      YPLIST
      .018.     FCMP     YPLIST,5
                TPL      ,015.,$
                FLD      YPLIST,5
                EAX4     0,5
      .015.     EAX5     -1,5
                TPL      ,018.,$
                LDA      =0400000,DU      LDA WITH FLOATING PT ZERO
                STA      YPLIST,4
                EAX6     -1,6
                TPL      ,016.,$
      .020.     EAX7     -1,7
                FLD      ZERO
      .017.     FAD      YPLIST,7
                EAX7     -1,7
                TPL      ,017.,$
                RETURN   SORTY
      .021.     CMPX7    0,DU
                TNZ      ,020.
      .019.     FLD      ZERO
                RETURN   SORTY
   77 NOG       SRT      7,6,YNLIST,TMI,SORTY
                EAX7     -1,7
                TMI      ,028.
      .023.     EAX5     -1,6
                TMI      ,026.
                LDX4     0,DU
                FLD      YNLIST
      .025.     FCMP     YNLIST,5
                TMI      ,022.,$
                FLD      YNLIST,5
                EAX4     0,5
      .022.     EAX5     -1,5
                TPL      ,025.,$
                LDA      =0400000,DU      LDA WITH FLOATING PT ZERO
                STA      YNLIST,4
                EAX7     -1,7
                TPL      ,023.,$
      .027.     EAX6     -1,6
                FLD      ZERO
      .024.     FAD      YNLIST,6
                EAX6     -1,6
                TPL      ,024.,$
                RETURN   SORTY
      .028.     CMPX6    0,DU
                TNZ      ,027.
      .026.     FLD      ZERO
                RETURN   SORTY
   78 ZERO      OCT      400000000000
   79           BLOCK
   80           BSS      14167
   81 NPX       BSS      1
   82 NNX       BSS      1
   83 NPY       BSS      1
   84 NNY       BSS      1
   85 VECT      BSS      600
   86 XPLIST    BSS      100
   87 XNLIST    BSS      100
   88 YPLIST    BSS      100
   89 YNLIST    BSS      100
```

Fig. 12E

```
C REPULS    SCANLON SUBROUTINE REPULS  OVLY2
C             COMPUTES DISACCOCIATIVE FORCES
        SUBROUTINE REPULS
*
       COMMON LET(21),NETS(1000,11),NETWHT(1000),NUMNET,POSITN(2,300),
      1      SITE(2,300),NSITE(300),ITABLE(300),LBAR(300),NFREE,NFIX,
      2      NFIXCX,NFIXCY,TOTAL,GREAT,FRAC,FRAC1,FRAC2,STOPA,STOP1,
      3      STOP2,XCENT,YCENT,XAVE,YAVE,LOOP1,LOOP2,RADIUS,NRUNS,
      4      NSS(5),INCRMX,NRORD,IXTRA,ARG1,RMIN,ASCALE,BSCALE,IRG1,
      5      IRG2,IRG3,IRG4,MSCALE,NPRNT,TOTAL1,RPRADI,NCHANG,ITERAL,
      6      LORDAL,RADIY,NAVER,NPX,NNX,NPY,NNY,
      7      VECTOR(2,300),XPLIST(100),XNLIST(100),YPLIST(100),
      8      YNLIST(100),PHYSCL(2,300),KONEX(300,100),Y(2,400),
      9      NKONEX(300),NPOSIT(300)
       COMMON/BOARD/BDESIR(2),SDESIR(2),DIMENX,DIMENY,PITCHY
*
**********************************************************************
* THIS ROUTINE EXAMINES ALL MODULES WITHIN A NEIGHBORHOOD OF FENCE   *
* AND  IF THERE IS NO CONNECTION BETWEEN THEM, ADDS A VECTOR         *
* PUSHING THEM APART                                                 *
* CALLED DURING CONVERG FROM CONVRG,   CALLS NO OTHER ROUTINES       *
*                                                                    *
* USES DECISION MATRIX FOR MODULE TYPES AND LBAR LOGIC.              *
*                                                                    *
**********************************************************************
*
      FENCE=RPRADI*DIMENX
      NSTOP1=NFIXCY-1
*                                        DO ALL FREE MODULES (MOD1)
      DO 100 MOD1=1,NSTOP1
      LBR1=LBAR(MOD1)
      NSTRT2=MOD1+1
*                                        LOOK AT ALL MODULES MOD2.GT. MOD1
      DO 100 MOD2=NSTRT2,NFIXCY
      LBR2=LBAR(MOD2)
      XD=POSITN(1,MOD1)-POSITN(1,MOD2)
      YD=POSITN(2,MOD1)-POSITN(2,MOD2)
      DIST=SQRT(XD**2 + YD**2)
*                                        IS DISTANCE TOO CLOSE
       IF(DIST.GT.FENCE) GO TO 100
       NCONEX=NKONEX(MOD1)
* IF ONE OF THE MODULES IS A VOID, IGNORE REPULSION FORCE
      IF(NCONEX.EQ.0 .OR. NKONEX(MOD2).EQ.0) GO TO 100
*                                        IF SO, ARE MODULES WIRED TOGETHER
       DO 50 K=1,NCONEX
       IF(KONEX(MOD1,K).EQ.MOD2) GO TO 100
50     CONTINUE
*
*                                 IF NOT CONNECTED APPLY REPULSIVE FORCE
60    RFRAC=FENCE-DIST
      FORCEX=XD*RFRAC
      FORCEY=YD*RFRAC
      IF(MOD1.LE.NFREE) GO TO 70
      IF(MOD1.LE.NFIX) GO TO 72
      IF(MOD1.LE.NFIXCX) GO TO 74
* TO HERE IF MOD1 FIXCY TYPE .. IF SO MOD2 MUST BE FIXCY ALSO
      GO TO 76
* TO 74 IF FIXCX... SO MOD2 MUST BE FIXED= X OR Y
74    FORCEX=2.*FORCEX
      GO TO 76
* TO 72 IF MOD1 IS FIXED XY TYPE
72    FORCEX=2.*FORCEX
      FORCEY=2.*FORCEY
      GO TO 76
* TO 70 IF MOD1 IS FREE TYPE
70    IF(MOD2.LE.NFREE) GO TO 76
      IF(MOD2.LE.NFIX) GO TO 72
      IF(MOD2.LE.NFIXCX) GO TO 74
      FORCEY=FORCEY*2.0
76    CONTINUE
```

FIG-13A

```
*
* DELETE FORCES PARALLEL TO BAR TYPE CONNECTORS
      GO TO (83,85,87),LBR1
83    GO TO (88,85,87),LBR2
85    FORCEY=0.0
      GO TO 88
87    FORCEX=0.0
88    CONTINUE
*
       VECTOR(1,MOD1)=VECTOR(1,MOD1)+FORCEX
       VECTOR(2,MOD1)=VECTOR(2,MOD1)+FORCEY
       VECTOR(1,MOD2)=VECTOR(1,MOD2)-FORCEX
       VECTOR(2,MOD2)=VECTOR(2,MOD2)-FORCEY
100   CONTINUE
      RETURN
      END

73 WORDS OF MEMORY USED BY THIS COMPILATION
```

FIG. 13B

```
C MOVE      SCANLON SUBROUTINE MOVE  OVLY2
C               CALCS MOBILITY FACTOR AND MOVES MODULES
      SUBROUTINE MOVE
*
      COMMON LET(21),NETS(1000,11),NETWHT(1000),NUMNET,POSITN(2,300),
     1       SITE(2,300),NSITE(300),ITABLE(300),LBAR(300),NFREE,NFIX,
     2       NFIXCX,NFIXCY,TOTAL,GREAT,FRAC,FRAC1,FRAC2,STOPA,STOP1,
     3       STOP2,XCENT,YCENT,XAVE,YAVE,LOOP1,LOOP2,RADIUS,NRUNS,
     4       NSS(5),INCRMX,NRORD,IXTRA,ARG1,RMIN,ASCALE,BSCALE,IRG1,
     5       IRG2,IRG3,IRG4,MSCALE,NPRNT,TOTAL1,RPRADI,NCHANG,ITERAL,
     6       LORDAL,RADIY,NAVER,NPX,NNX,NPY,NNY,
     7       VECTOR(2,300),XPLIST(100),XNLIST(100),YPLIST(100),
     8       YNLIST(100),PHYSCL(2,300),KONEX(300,100),Y(2,400),
     9       NKONEX(300),NPOSIT(300)
      COMMON/BOARD/BDESIR(2),SDESIR(2),DIMENX,DIMENY,PITCHY
      COMMON/STATE/PROCES(3),NOWPRO,ITSAVE,NOWMOD
      EQUIVALENCE(VTOT,XPLIST(1))
*
************************************************************************
* THIS ROUTINE MOVES EACH MODULE OR PIN AN INCREMENTAL FRACTION OF     *
* ITS COMPUTED VECTOR UNLESS IT IS A FIXED POINT                       *
************************************************************************
*
      SCAN=.5
      IF(NOWPRO.EQ.2) SCAN=.05
      ARG1=0.0
      VTOT=0.
      FRAC=1.E-2
      FRACY=FRAC*PITCHY
      IF(NFREE .EQ. 0) GO TO 10
* COMPUTE AVERAGE VECTOR AND UPDATE MOBILITY FACTOR AND MAX VECTOR
      DO 1 I=1,NFREE
      V=SQRT(VECTOR(1,I)**2 + VECTOR(2,I)**2)
      VTOT=VTOT+V
      IF(V.LE.ARG1) GO TO 1
      ARG1=V
      IXTRA=I
1     CONTINUE
      VTOT=VTOT/FLOAT(NFREE)
      IF(VTOT.GT.FRAC1)VTOT=FRAC1
      FRAC=SCAN*VTOT/ARG1
      FRACY=FRAC*PITCHY
      DO 2 I=1,NFREE
      POSITN(1,I)=POSITN(1,I)+VECTOR(1,I)*FRAC
2     POSITN(2,I)=POSITN(2,I)+VECTOR(2,I)*FRACY
   10 IF(NFIXCX .EQ. NFIX) GO TO 20
      NS=NFIX+1
      DO 3 I=NS,NFIXCX
3     POSITN(2,I)=POSITN(2,I)+VECTOR(2,I)*FRACY
   20 IF(NFIXCX .EQ. NFIXCY) RETURN
      NS=NFIXCX+1
      DO 4 I=NS,NFIXCY
4     POSITN(1,I)=POSITN(1,I)+VECTOR(1,I)*FRAC
      RETURN
      END

87 WORDS OF MEMORY USED BY THIS COMPILATION
```

FIG. 14

```
C CALC      SCANLON SUBROUTINE CALC  OVLY2
C              COMPUTE VECTORS BY SIMPLE PROPORTION
      SUBROUTINE CALC
*
      COMMON LET(21),NETS(1000,11),NETWHT(1000),NUMNET,POSITN(2,300),
     1       SITE(2,300),NSITE(300),ITABLE(300),LBAR(300),NFREE,NFIX,
     2       NFIXCX,NFIXCY,TOTAL,GREAT,FRAC,FRAC1,FRAC2,STOPA,STOP1,
     3       STOP2,XCENT,YCENT,XAVE,YAVE,LOOP1,LOOP2,RADIUS,NRUNS,
     4       NSS(5),INCRMX,NRORD,IXTRA,ARG1,RMIN,ASCALE,BSCALE,IRG1,
     5       IRG2,IRG3,IRG4,MSCALE,NPRNT,TOTAL1,RPRADI,NCHANG,ITERAL,
     6       LORDAL,RADIY,NAVER,NPX,NNX,NPY,NNY,
     7       VECTOR(2,300),XPLIST(100),XNLIST(100),YPLIST(100),
     8       YNLIST(100),PHYSCL(2,300),KONEX(300,100),Y(2,400),
     9       NKONEX(300),NPOSIT(300)
       COMMON/BOARD/BDESIR(2),SDESIR(2),DIMENX,DIMENY,PITCHY
*
**********************************************************************
* THIS SUBROUTINE COMPUTES ELECTRICAL FORCE VECTORS FOR ALL MODULES IN *
* ALL NETS AND STORES IN VECTOR,  XCORD IN 1 ,YCORD IN 2.             *
* THIS ROUTINE CALCULATES ELECTRICAL VECTORS BY SUMMATION OF          *
* SIMPLE DISTANCES * * DIFFERENT FROM CALC-SORT ROUTINE               *
* USES DECISION MATRIX FOR MODULE TYPES AND LBAR LOGIC.               *
**********************************************************************
*
      TOTAL=0.0
      GREAT=0.0
      DO 1 I=1,NFIXCY
      VECTOR(1,I)= 0.0
    1 VECTOR(2,I)= 0.0
      DO 700 LOC1=1,NFIXCY
      LINK=NKONEX(LOC1)
      IF(LINK.EQ.0) GO TO 700
      LBAR1=LBAR(LOC1)
      DO 550 N=1,LINK
      LOC2=KONEX(LOC1,N)
      LBAR2=LBAR(LOC2)
      XD=POSITN(1,LOC1)-POSITN(1,LOC2)
      YD=POSITN(2,LOC1)-POSITN(2,LOC2)
      VMX=1.0
      VMY=1.0
* IGNORE PARALLEL CONNECTIONS TO BAR TYPES
      GO TO ( 10,11,12),LBAR1
10    GO TO (13,11,12),LBAR2
11    YD=0.0
      GO TO 13
12    XD=0.0
13    ABDIST=ABS(XD)+ABS(YD)
      TOTAL=TOTAL+ABDIST
      IF(ABDIST.GT.GREAT) GREAT=ABDIST
* ENTER MATRIX TO DETERMINE CLASS OF EACH MODULE
      IF(LOC1.LE.NFREE .AND. LOC2.LE.NFREE) GO TO 600
      IF(LOC1.GT.NFREE) GO TO 90
* TO HERE IF LOC1 IS FREE BUT LOC2 IS NOT
      IF(LOC2.LE.NFIX) GO TO 50
      IF(LOC2.LE.NFIXCX) GO TO 60
70    VMY=2.0
      GO TO 600
90    IF(LOC1.LE.NFIX) GO TO 50
      IF(LOC1.LE.NFIXCX) GO TO 95
* TO HERE IF LOC1 IS FIXED-Y
      IF(LOC2.LE.NFREE) GO TO 70
      IF(LOC2.LE.NFIXCX) GO TO 50
      GO TO 600
* TO HERE IF LOC1 IS FIXED-X
95    IF(LOC2.GT.NFREE) GO TO 97
* TO 60 FOR FREE-FIX-X COMBINATION
60    VMX=2.0
      GO TO 600
97    IF(LOC2.LE.NFIX) GO TO 50
```

FIG-15A

```
      IF(LOC2.LE.NFIXCX) GO TO 600
50    VMX=2.0
      VMY=2.0
600   CONTINUE
      DX=VMX*(XD-SIGN(DIMENX,XD))
      DY=VMY*(YD-SIGN(DIMENY,YD))
      VECTOR(1,LOC1)=VECTOR(1,LOC1)-DX
      VECTOR(2,LOC1)=VECTOR(2,LOC1)-DY
      VECTOR(1,LOC2)=VECTOR(1,LOC2)+DX
      VECTOR(2,LOC2)=VECTOR(2,LOC2)+DY
550   CONTINUE
  700 CONTINUE
      TOTAL=0.5*TOTAL
      RETURN
      END

73 WORDS OF MEMORY USED BY THIS COMPILATION
```

FIG. 15B

```
C BLOW      SCANLON SUBROUTINE BLOW  OVLY2
C              COMPUTE PHYSICAL VECTORS TO EXPAND
      SUBROUTINE BLOW
*
      COMMON LET(21),NETS(1000,11),NETWHT(1000),NUMNET,POSITN(2,300),
     1        SITE(2,300),NSITE(300),ITABLE(300),LBAR(300),NFREE,NFIX,
     2        NFIXCX,NFIXCY,TOTAL,GREAT,FRAC,FRAC1,FRAC2,STOPA,STOP1,
     3        STOP2,XCENT,YCENT,XAVE,YAVE,LOOP1,LOOP2,RADIUS,NRUNS,
     4        NSS(5),INCRMX,NRORD,IXTRA,ARG1,RMIN,ASCALE,BSCALE,IRG1,
     5        IRG2,IRG3,IRG4,MSCALE,NPRNT,TOTAL1,RPRADI,NCHANG,ITERAL,
     6        LORDAL,RADIY,NAVEP,NPX,NNX,NPY,NNY,
     7        VECTOR(2,300),XPLIST(100),XNLIST(100),YPLIST(100),
     8        YNLIST(100),PHYSCL(2,300),KONEX(300,100),Y(2,400),
     9        NKONEX(300),NPOSIT(300)
      COMMON/BOARD/BDESIR(2),SDESIR(2),DIMENX,DIMENY,PITCHY
      EQUIVALENCE (OVERLP,XPLIST(2))
*
*****************************************************************************
*                                                                           *
* THIS ROUTINE COMPUTES THE PHYSICAL FORCES NECESSARY TO ELIMINATE          *
* OVERLAP BETWEEN THE MODULES. THIS INFORMATION IS VECTORIALLY COMBINED*
* WITH THE ELECTRICAL ATTRACTION VECTORS IN ARRAY 'VECTOR'.                 *
* THE ROUTINE IS CALLED BY 'BLOWUP' AND USES 'CALC' TO COMPUTE              *
* ELECTRICAL ATTRACTION FORCES                                              *
*****************************************************************************
*
*****************************************************************************
* DESCRIPTION OF IMPORTANT VARIABLES;
*     VECMAX- - - - -LIMITING SIZE FOR FINAL VECTOR. PREVENTS OVERSHOOT.
*     RATIO - - - - -COMPARISON FACTOR FOR X VECTOR WITH Y TO DETERMINE
*                    IF ONE IS DOMINANT OVER OTHER. (GREATER THAN RATIO)
*     OVERLP- - - - -TOTAL PHYSICAL OVERLAP IN INCHES
*     RADMIN- - - - -MINIMUM PHYSICAL SEPARATION BETWEEN CLOSEST MODULES
* VARIABLE 'PHYSCL' IS ARRAY FOR PHYSICAL FORCE VECTORS; AND IS
* INITIALIZED BY BLOWUP WITH ZERO IN UNBOUNDED CASE, OR
* WITH BORDER FORCES IN BOUNDED MODE
*****************************************************************************
*
      FZERO=1.E-5
      RATIO=2.
      RATINV=1./RATIO
      OVERLP=0.
      RADMIN=1.E10
*****************************************************************************
* INITIALIZE VECTOR WITH ELECTRICAL ATTRACTIONS                             *
* NOTE* CALSRT NOT USED * VECTORS ARE SIMPLE PROPORTIONS TO LENGTH          *
*****************************************************************************
*
      CALL CALC
*
*****************************************************************************
* COMPUTE PHYSICAL VECTORS                                                  *
*****************************************************************************
*
      NSTOP1=NFIXCY-1
      DO 100 MOD1=1,NSTOP1
      NSTRT2=MOD1+1
      LBR1=LBAR(MOD1)
      DO 100 MOD2=NSTRT2,NFIXCY
      LBR2=LBAR(MOD2)
      XD=POSITN(1,MOD1)-POSITN(1,MOD2)
      YD=POSITN(2,MOD1)-POSITN(2,MOD2)
      DIST=SQRT(XD**2+YD**2)
      ABYD=ABS(YD)
      ABXD=ABS(XD)
      DIFFX=DIMENX-ABXD
      DIFFY=DIMENY-ABYD
* FOLLOWING DECISION FOR MIN OVERLAP AXIS; HENCE MOST RAPID REDUCTION
      GO TO (5,19,12),LBR1
```

Fig-16A

```
5       GO TO (10,15,12),LBR2
* FOLLOWING CONDITION "GO TO 100 IF MODULES ARE NOT OVERLAPPING"
10      IF(DIFFX.LE.FZERO .OR. DIFFY.LE.FZERO) GO TO 100
        OVER=SQRT(DIFFY**2 + DIFFX**2)
        OVERLP=OVERLP + OVER
        DR=DIFFX/DIFFY
* DECIDE IF OVELAP IS EQUALLY DIVIDED BETWEEN X AND Y
        IF(DR.GT.RATINV .AND. DR.LE.RATIO) GO TO 90
* IF NOT EVENLY DIVDED, MOVE MODULES IN DIRECTION OF MINIMUM OVERLAP
* IN ORDER TO MOST QUICKLY REDUCE THE OVERLAP
* MOVE MOD1 BY AMOUNT DIFF WITH SENSE (SIGN) OF XD OR YD
* MOVE MOD2 IN OPPOSITE SENSE
        IF(DR.LT.1.0) GO TO 14
* TO HERE IF DIFFY.LT.DIFFX BY MORE THAN 'RATIO'
        IF (DIST .LT. RADMIN) RADMIN=DIST
        GO TO 13
* TO '12' IF ONE OF THE MODULES IS A Y-BAR
12      IF(DIFFY.LE.FZERO) GO TO 100
* TWO Y-BARS DONT REPEL EACH OTHER IN Y DIRECTION
        IF(LBR1.EQ.3.AND.LBR2.EQ.3) GO TO 100
        OVERLP=OVERLP + ABS(DIFFY)
        IF(ABYD .LT. RADMIN) RADMIN=ABYD
13      FORCEX=0.
        FORCEY=FRAC2*SIGN(DIFFY,YD)
        GO TO 95
*
* TO '14' IF DIFFX.LT.DIFFY BY MORE THAN 'RATIO'
*
   14 IF (DIST .LT. RADMIN) RADMIN=DIST
        GO TO 16
* TO '15' IF ONE OF THE MODULES IS A X-BAR
15      IF(DIFFX.LE.FZERO) GO TO 100
* TWO X-BARS DONT REPEL EACH OTHER IN X DIRECTION
        IF(LBR1.EQ.2.AND.LBR2.EQ.2) GO TO 100
        OVERLP=OVERLP + ABS(DIFFX)
        IF(ABXD.LT.RADMIN) RADMIN=ABXD
16      FORCEY=0.0
        FORCEX=FRAC2*SIGN(DIFFX,XD)
        GO TO 95
   90 IF (DIST .LT. RADMIN) RADMIN=DIST
        FORCEX=FRAC2*SIGN(DIFFX,XD)
        FORCEY=FRAC2*SIGN(DIFFY,YD)
95      CONTINUE
*
*************************************************************************
* ADD TO PHYSICAL FORCE VECTOR FOR BOTH MODULES REGARDLESS OF TYPE      *
*************************************************************************
*
        PHYSCL(1,MOD1)=PHYSCL(1,MOD1)+FORCEX
        PHYSCL(1,MOD2)=PHYSCL(1,MOD2)-FORCEX
        PHYSCL(2,MOD1)=PHYSCL(2,MOD1)+FORCEY
        PHYSCL(2,MOD2)=PHYSCL(2,MOD2)-FORCEY
* IF MOD2 IS FIXED, MOD1 RECEIVES TWICE THE FORCE
        IF(MOD2 .LE. NFREE) GO TO 100
        PHYSCL(1,MOD1)=PHYSCL(1,MOD1)+FORCEX
        PHYSCL(2,MOD1)=PHYSCL(2,MOD1)+FORCEY
100     CONTINUE
*
*************************************************************************
* MERGE PHYSICAL VECTORS WITH ELEC VECTORS PREVIOUSLY SAVED IN 'VECTOR' *
* IF VECTOR AND PHYSCL HAVE SAME SENSE ADD TO FORM RESULTANT            *
* IF OPPOSITE SENSE, RESULTANT=PHYSCL                                   *
*************************************************************************
*
        DO 200 MODULE=1,NFIXCY
        DO 200 KORD=1,2
        IF(VECTOR(KORD,MODULE).GE. 0.0 .AND. PHYSCL(KORD,MODULE).GE. 0.0
      1.OR. VECTOR(KORD,MODULE).LE.0. .AND. PHYSCL(KORD,MODULE).LE. 0.0)
      2 PHYSCL(KORD,MODULE)=PHYSCL(KORD,MODULE)+VECTOR(KORD,MODULE)
```

Fig-16B

```
      VECTOR(KORD,MODULE)=PHYSCL(KORD,MODULE)
200   CONTINUE
      RMIN=RADMIN
      RETURN
      END

19 WORDS OF MEMORY USED BY THIS COMPILATION
```

FIG. 16C

```
C BOUNDS     SCANLON SUBROUTINE BOUNDS  OVLY2
C               COMPUTE FORCES OF BOARD EDGES
      SUBROUTINE BOUNDS(*,IWAY)
*
      COMMON LET(21),NETS(1000,11),NETWHT(1000),NUMNET,POSITN(2,300),
     1       SITE(2,300),NSITE(300),ITABLE(300),LBAR(300),NFREE,NFIX,
     2       NFIXCX,NFIXCY,TOTAL,GREAT,FRAC,FRAC1,FRAC2,STOPA,STOP1,
     3       STOP2,XCENT,YCENT,XAVE,YAVE,LOOP1,LOOP2,RADIUS,NRUNS,
     4       NSS(5),INCRMX,NRORD,IXTRA,ARG1,RMIN,ASCALE,BSCALE,IRG1,
     5       IRG2,IRG3,IRG4,MSCALE,NPRNT,TOTAL1,RPRADI,NCHANG,ITERAL,
     6       LORDAL,RADIY,NAVER,NPX,NNX,NPY,NNY,
     7       VECTOR(2,300),XPLIST(100),XNLIST(100),YPLIST(100),
     8       YNLIST(100),PHYSCL(2,300),KONEX(300,100),Y(2,400),
     9       NKONEX(300),NPOSIT(300)
      COMMON/BOARD/BDESIR(2),SDESIR(2),DIMENX,DIMENY,PITCHY
      DIMENSION BBOUND(2),SBOUND(2),NSKIPB(2),NSKIPS(2)
*
*************************************************************************
* THIS SUBROUTINE COMPUTES THE PRESENT ORTHAGONAL BOUNDARIES OF THE     *
* LAYOUT AND, IF THEY ARE NOT THE BOUNDS DESIRED, APPLIES PHYSICAL      *
* FORCES TO THE MODULES TO COMPRESS THEM INTO THIS AREA.                *
* VARIABLE IWAY CONTROLS  WHICH AXIS TO APPLY BORDERS                   *
*     IWAY = 1 FOR BORDERS FROM X DIRECTION (LEFT AND RIGHT)            *
*     IWAY = 2 FOR BORDERS IN Y DIRECTION (TOP AND BOTTOM BORDER)       *
*     IWAY = 3 FOR BOTH X AND Y FORCES CONCURRENTLY                     *
* PHYSCL VECTORS INITIALIZED IN BLOWUP                                  *
*************************************************************************
*
      FRACM=20.*FRAC2
      HLFRAD=.5*RADIUS
* FIND PRESENT RECTANGULAR BORDER SIZE CONTAINING ALL MODULES
      DO 100 KORD=1,2
      SMALL=1.E10
      BIG=0
      DO  99 MOD=1,NFREE
      IF(POSITN(KORD,MOD).LT.SMALL)SMALL=POSITN(KORD,MOD)
      IF(POSITN(KORD,MOD).GT.BIG)  BIG=POSITN(KORD,MOD)
99    CONTINUE
      BBOUND(KORD)=BIG
      SBOUND(KORD)=SMALL
100   CONTINUE
*
* NSKIP WILL BE  1  UNLESS RESPECTIVE BORDER IS EQUAL TO DESIRED BORDER
      NSKIPB(1)=1
      NSKIPB(2)=1
      NSKIPS(1)=1
      NSKIPS(2)=1
       IF( IWAY .GT. 2) GO TO 96
       IF( IWAY .EQ. 2) GO TO 95
      NSKIPB(2)=0
      NSKIPS(2)=0
      GO TO 96
95    NSKIPB(1)=0
      NSKIPS(1)=0
96    CONTINUE
      DO 101 KORD=1,2
101   IF(BBOUND(KORD).LE. BDESIR(KORD))NSKIPB(KORD)=0
      DO 102 KORD=1,2
102   IF(SBOUND(KORD).GE. SDESIR(KORD))NSKIPS(KORD)=0
* NORMAL RETURN IF STMNT IS TRUE (NOT=0)
* IF ALL CONDITIONS ARE ZERO, STMNT IS FALSE AND RETURN1
      NSKIP= OR(NSKIPS(1),NSKIPS(2),NSKIPB(1),NSKIPB(2))
* NSKIP WILL BE ZERO WHEN ALL BORDERS ARE WITHIN SPECS
      IF(NSKIP.EQ.0) RETURN1
*
* CHECK ALL MODULES TO SEE IF THEY ARE AT LEAST 1/2
* OF DESIRED SEPARATION DISTANCE FROM BOUNDARIES
*
*  REDUCE BORDERS BY MODULE DIMENSION SINCE CENTER TO CENTER
```

FIG. 17A

```
* FORCE IS NOT ENOUGH TO BRING MODULE ON BOARD
*
      BX=BDESIR(1)-DIMENX
      BY=BDESIR(2)-DIMENY
      SX=SDESIR(1)+DIMENX
      SY=SDESIR(2)+DIMENY
      DO 200 MOD=1,NFREE
      IF(NSKIPB(1).EQ.0) GO TO 5
      DX=BX-POSITN(1,MOD)
      IF(DX.GE. 0.0  )GO TO 5
      PHYSCL(1,MOD)=PHYSCL(1,MOD)+DX*FRACM
      GO TO 6
5     IF(NSKIPS(1).EQ.0) GO TO 6
      DX=POSITN(1,MOD)-SX
      IF(DX.GE. 0.0  )GO TO 6
      PHYSCL(1,MOD)=PHYSCL(1,MOD)-DX*FRACM
6     IF(NSKIPB(2).EQ.0) GO TO 7
      DY=BY-POSITN(2,MOD)
      IF(DY.GE.  0.0)  GO TO 7
      PHYSCL(2,MOD)=PHYSCL(2,MOD)+DY*FRACM
      GO TO 200
7     IF(NSKIPS(2).EQ.0) GO TO 200
      DY=POSITN(2,MOD)-SY
      IF (DY .LT. 0.0) PHYSCL(2,MOD)=PHYSCL(2,MOD)-DY*FRACM
200   CONTINUE
      RETURN
      END

40 WORDS OF MEMORY USED BY THIS COMPILATION
```

FIG. 17B

MACHINE PROCESS FOR POSITIONING INTERCONNECTED COMPONENTS TO MINIMIZE INTERCONNECTING LINE LENGTH

BACKGROUND OF THE INVENTION

1. Field of the Invention

This invention relates to machine processes for positioning interconnected components on a field, and, more particularly, to a method for operating a machine, such as a digital computer, in accordance with an algorithm for positioning interconnected components to minimize interconnecting line length 2. Description of the Prior Art The following are basic definitions necessary for understanding the background of the present invention and the invention itself.

1. Field — A two-dimensional surface of arbitrary shape, having a plurality of sites, the locations of such sites on the surface being either arbitrary or predefined. A field may be used to represent a particular circuit board on which electrical components are to be placed and for purposes herein will be considered synonymous therewith. The topology of fields will be defined by a Cartesian coordinate system.

2. Module — Any discrete element or component occupying a specific physical location on a field. For purposes herein, the term module will be used to represent such items as a circuit package, chip, integrated circuit, component, connector, or other element which is to be mounted on a circuit board. The location of a module on a field will be defined by X and Y coordinates. A module may have many pins for input and output signals, but for purposes herein, all pins of a module will be considered as one point. There are five classifications of modules as follows:

a. Free module — A module which may assume any X and Y coordinates necessary for its placement. The only restriction is that it must be placed so that it is within the boundaries of the field and not interfering with other modules.

b. Fixed module — A module which must be placed at a specific location in the field, i.e., a module having predetermined X and Y coordinates.

c. Fixed X module — A module whose X coordinate must remain constant but whose Y coordinate may assume any value.

d. Fixed Y module — A module whose Y coordinate must remain constant but whose X coordinate may assume any value.

e. Bar module — A module having nonlimited length in either the X or Y dimension. Thus a bar module will be parallel to either the X or Y axes of the coordinate system. A bar module will either be free, fixed X (if its length is in the Y direction) or fixed Y (if its length is in the X direction).

3. Logic net — The interconnection of a group of modules. Specifically, a logic net consists of all commonly connected pins of a group of modules.

4. Source — A module whose output feeds one or more inputs or sinks of another module. Where such a module exists and is unique to a logic net, it will be referred to as a source module.

5. Star connection — An interconnection mode in which each sink is connected directly to the source.

6. Serial connection — An interconnection mode in which the sinks of a logic net are connected in a serial fashion to form a single string from the source module to a final sink.

7. Minimum distance connection — An interconnection mode of either the star or serial type, or a combination of the two, in which the interconnecting line length is minimum for the configuration of modules in question.

The problem of design and construction of circuits has been compounded with the increased miniaturization of electronic components and the attendant increased packing density of components on a circuit board. As a result, considerable interest has developed in finding automated techniques for positioning such components on a board so as to minimize the interconnection problem and facilitate ease of fabrication.

A number of schemes have been developed for automatically positioning components on a circuit board or, more generally, for positioning modules on a field. For example, the placement problem has been formulated as an integer linear programming problem with the criteria for optimality being minimized total interconnecting line length. M.A. Breuer, "The Application of Integer Programming in Design Automation," *SHARE Proceedings*, Design Automation Workshop, May, 1966, page 10. The linear programming approach, although providing an exact answer as to optimality is impractical if the number of modules to be positioned is very large. This is because the time required to process and position modules in a field by the linear programming approach would be prohibitive for large numbers of modules.

Several heuristic approaches, in which minimization of total interconnecting line length is again the goal, have also been proposed. See for example, Rutman, R.A., "An Algorithm for Placement of Interconnected Elements Based on Minimum Wire Length," AFIPS Conference Proceedings, Volume 25, 1964, SJCC, pages 477–491 and Fisk, C.J., et al., "ACCEL: Automatic Circuit Card Etching Layout," Proc. of IEEE, November 1967, pages 1971–1982. The last mentioned reference discloses a method which utilizes a so-called "forces of attraction and repulsion" criteria for locating components on a printed circuit board. Components which are connected are considered as having a force of attraction therebetween whereas components which are not connected are considered as having a force of repulsion therebetween. The components are examined sequentially and then moved in the direction of the forces in accordance with certain specific criteria (not specifically described in the reference). It would appear that since the components or elements are processed sequentially, the final positioning of elements may be greatly dependent upon the order in which the elements are processed. Sequential processing may also lead to congestion or "jamming" of elements.

SUMMARY OF THE INVENTION

It is an object of this invention to provide a fast, flexible and efficient machine process for positioning interconnected modules on a field so as to minimize interconnecting line length.

It is another object of the present invention to provide such a process wherein modules are simultaneously repositioned.

It is still another object of the present invention to provide such a process wherein logic nets of interconnected modules are simultaneously reordered.

It is also an object of the present invention to provide such a process wherein modules are repositioned in accordance with a formula which allows large movement of interconnected modules towards each other but which prevents overshoot of such modules.

These and other objects of the present invention are realized in a specific illustrative algorithm in which the logic nets of interconnected modules are first reordered in an attempt to minimize total line length for the nets. Vector forces of attraction are then computed for interconnected modules and vector forces of repulsion are computed for unconnected modules. The modules are then simultaneously moved in accordance with these vector forces and in accordance with a formula which provides for large movement of interconnected modules towards each other but prevents overshoot of such modules. This process may be repeated as often as desired by the user — for example, until a certain total line length is obtained or until little or no improvement is achieved from one iteration to the next. This reordering and repositioning of components is performed first on nets having two components only. The process is repeated for nets having three components, etc., until all nets have been included. This algorithm may be programmed to operate on a general purpose computer.

It will be noted that when discussing the process of the present invention, the items being processed will be referred to as "modules," "vector forces," "line length," etc., and the various steps in the process will be described as "moving modules," etc. In making such reference, it is understood that such items would be represented by electrical signals of one kind or another in the implementation of the process on a general purpose computer and that such steps would be carried out by the general purpose computer simply by changing various parameters of the items. For example, when discussing "moving modules," it is understood that this simply means changing the data which define the location of the modules so as to represent the moves. The invention is described in these terms for clarity and because such terms are familiar to persons who might implement the algorithm on a general purpose computer, i.e., programmers.

BRIEF DESCRIPTION OF THE DRAWINGS

A complete understanding of the present invention and of the above and other advantages thereof may be gained from a consideration of the following detailed description of an illustrative embodiment thereof presented hereinbelow in connection with the accompanying drawings in which:

FIG. 1B, depict a generalized flow diagram representing a specific illustrative machine algorithm for practicing data processing in accordance with the present invention;

FIG. 6C, show a detailed flow diagram of the reordering and repositioning process of the CONVERGE algorithm of the FIGS. 1A and 1B process;

FIG. 8D, show a detailed flow diagram of the BLOWUP algorithm of the FIGS. 1A and 1B process.

FIGS. 9A–9F, 10A–10D, 11A–11D, 12A–12E, 13A, 13B, 14, 15A, 15B, 16A–16C, 17A and 17B show an illustrative computer program for implementing the algorithms represented by FIGS. 1A, 1B, 5, 6A–6C, and 8A–8D.

DETAILED DESCRIPTION

Figure 1A:
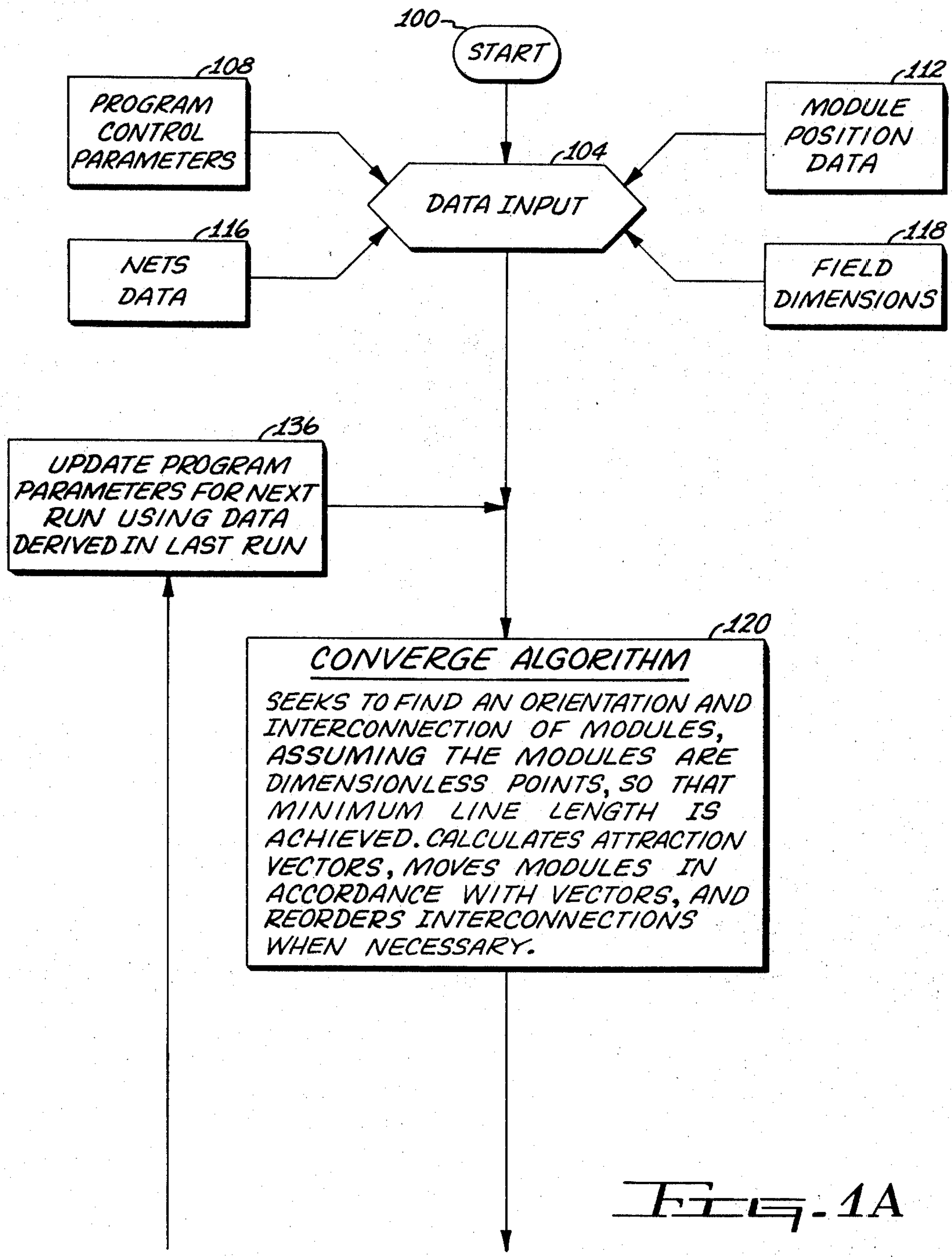
FIGS. 1A and 1B, with FIG. 1A positioned above
Figure 1B:
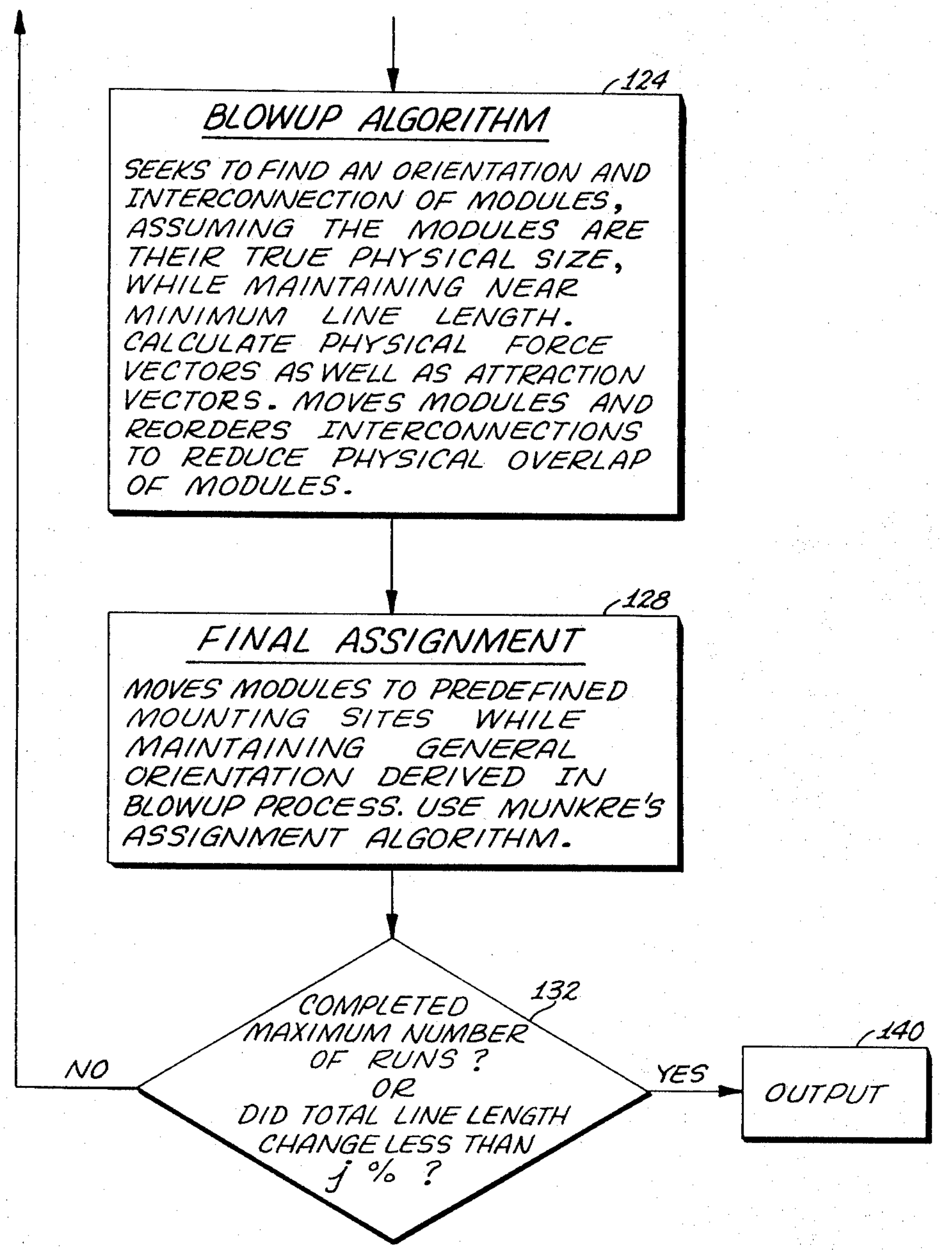

The first steps of the algorithm represented by the flow chart of FIGS. 1A and 1B are to input the data necessary to carry out the represented process. Such data may be broken down into four general classes including: (1) program control parameters, as represented by block 108, (2) module position data, as represented by block 112, (3) interconnecting nets data, as represented by block 116, and (4) field dimension data, as represented by block 118. The program control parameters, consist of the following:

a. Specification of the maximum number of iterations allowed for the overall process — this may be any number desired by the user; for example, it has been found advantageous to allow a maximum of four iterations for the overall process.

b. Stopping criteria for the CONVERGE algorithm (represented by block 120 of FIG. 1A) — this criteria determines when the CONVERGE algorithm is to terminate. Illustrative criteria will be given when the CONVERGE algorithm is described.

c. Stopping criteria for the BLOWUP algorithm (represented by block 124 of FIG. 1B) — this criteria is similar to that for the CONVERGE algorithm mentioned above. Illustrative criteria for the BLOWUP algorithm will also be given later.

d. Specification of the number of iterations allowed for the CONVERGE and BLOWUP algorithms — this information is likewise determined by the user. It has been found advantageous, for example, to limit the number of iterations in the CONVERGE phase to 75 or less for each group of nets processed — two-pin nets, three-pin nets, etc. It has also been found advantageous to limit the number of iterations in the BLOWUP algorithm to 20 or less for both the "unbounded" and "bounded" phases of BLOWUP. (The "unbounded" and "bounded" phases of BLOWUP will be described in detail later.)

The module position data represented by block 112 of FIG. 1A consists generally of information about each module to be positioned. This information includes:

a. The X- and Y-coordinates (assuming a Cartesian coordinate system) of the center of each module as it is to be initially positioned.
b. The dimensions of each module.
c. An identification of those modules which are free modules, fixed modules, fixed X modules, fixed Y-modules, and bar modules.

Figure 2A:
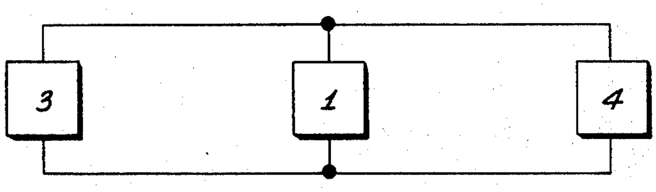
FIG. 2A shows an exemplary group of modules forming a logic net.
Figure 2B:
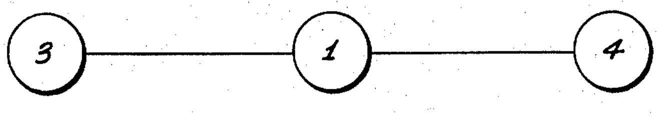
FIG. 2B shows the logic net of FIG. 2A as it would be represented in a data processor.

The nets data represented by block 116 of FIG. 1A indicates how the modules are interconnected. Each group of modules which form a logic net are specified beginning with the source module of the net. FIG. 2A shows an exemplary group of modules forming a logic net. The representation of the net in the data processor would be as shown in FIG. 2B. That is, module 3 would be represented as being connected to module 1, which, in turn, would be represented as being connected to module 4. Each of these modules could, of course, be connected to other modules with which they would form other logic nets. The nets data also includes the so-called "weight" of each net which indicates the number of repeated appearances of a net. To be a repeat appearance of a net, the repeated net must have the same source module plus the same group of modules to which it is connected. For example, the logic net of the group of modules in FIG. 2A would have a weight of two since the interconnection of module 3 to module 1 to module 4 occurs twice, i.e., there are two lines interconnecting module 3 to module 1 and module 1 to module 4.

Figure 3:
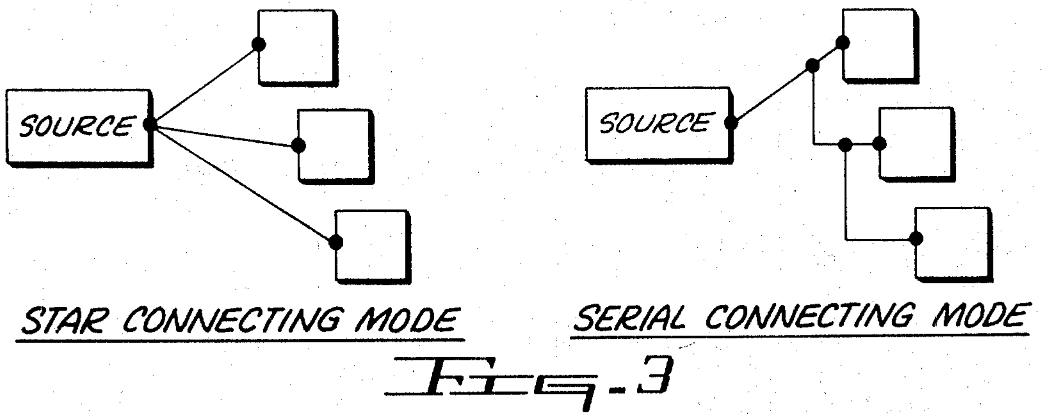
FIG. 3 shows two modes of connecting modules.

The nets data also includes the wiring rules under which each net is to be interconnected. As indicated earlier, a net may be connected either as a "star" connection, a "serial" connection, or a "minimum line length" connection. FIG. 3 illustrates the star connecting mode and the serial connecting mode. The minimum line length connecting mode is not shown since it simply consists of that interconnecting arrangement which provides minimum line length.

The final item of input data is the dimensions of the field in which the modules are to be positioned (represented by block 118). The field is represented as a rectangle of sufficient size to encompass the circuit board which the field is representing. Locations or voids on the board where no modules or components are to be positioned are represented as fixed nonconnected modules. By such representation, no other modules may be placed in the represented location. By modeling the modules and field in this manner, odd shaped circuit boards may be easily characterized.

Figure 4A:
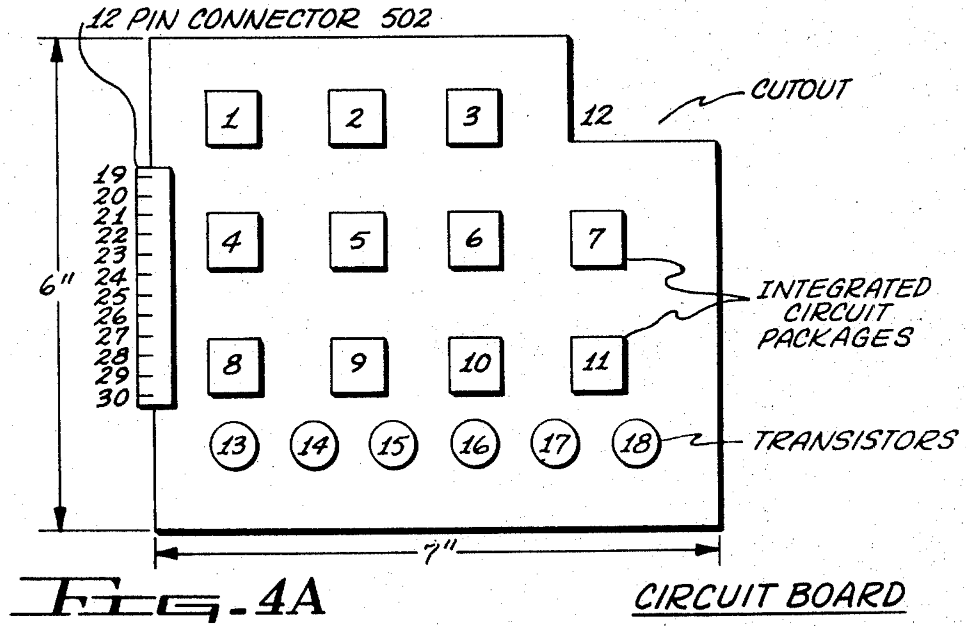
FIG. 4A, 4B, and 4C show an exemplary circuit board and a model and data used to represent the board.

An example of how a typical circuit board would be modeled for processing in accordance with the present invention will now be given. FIG. 4A shows an exemplary circuit board and the initial positioning of components which are to be placed on the board. The dimensions are shown as being 6 by 7 inches with a void existing in the upper right hand corner. The square blocks on the board represent integrated circuit packages of one kind or another and the round circles represent transistors. A 12-pin connector 502 is positioned on the left side of the board. The numbers on the various components of the board simply identify each of the components. The circuit packages, transistors, and connector would, of course, be electrically interconnected in some fashion not shown in FIG. 4A.

Figures 4B, 4C:
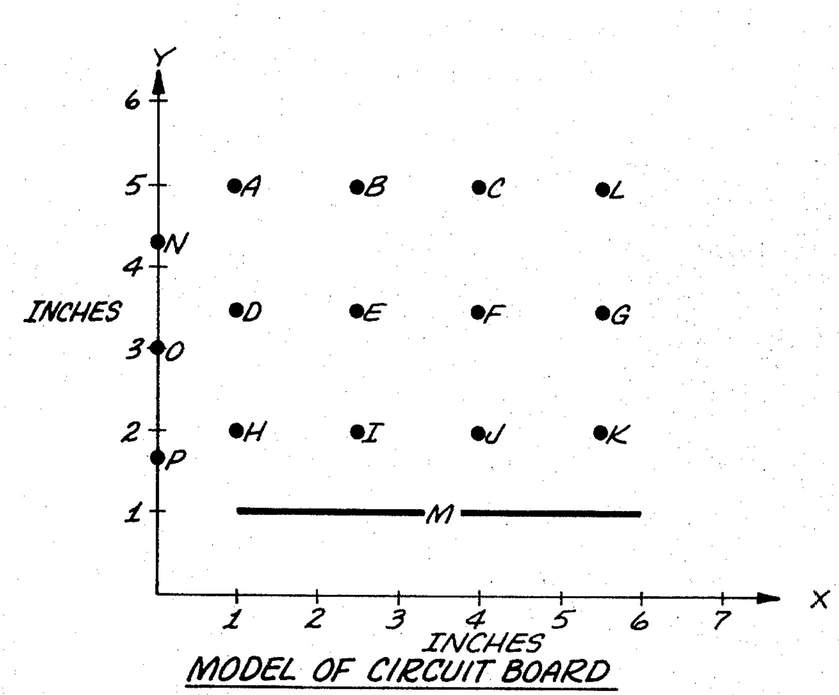

FIG. 4B shows a graphical model of the circuit board of FIG. 4A in a Cartesian coordinate system. FIG. 4C shows a table summarizing the data on each of the modules of the model. Each of the integrated circuit packages 1 through 11 of FIG. 4A are modeled as points A through K in FIG. 4B, with the points representing the center of the corresponding integrated circuit package of the board. The "cutout" 12 of the circuit board is also modeled as a point L. As indicated in FIG. 4C, the circuit packages represented as 1 through 11 are free modules and may be positioned anywhere on the board, whereas the cutout 12 is represented as a fixed module. This, of course, means that no other module will be allowed to occupy the position of the cutout.

For this example it is assumed that the six transistors, 13 through 18, on the circuit board are identical. That is, a connection from any integrated circuit package to a transistor may be made to any one of the transistors. For this reason the six transistors are modeled as a single fixed Y-bar module M as shown in FIG. 4B. Thus, any connection from the circuit it packages to the transistor will be considered a perpendicular connection with module M.

It was also assumed for the FIG. 4A circuit board example that the connector pins 19 through 30 could not be interchanged. However, rather than providing a separate module for each connector pin in the FIG. 4B model, the connector pins were grouped into fours and each group of four is represented by a single module on the FIG. 4B model. This reduces the number of modules which must be processed and yet provides a close approximation of the circuit board requirements.

The manner of specifying the interconnection data, i.e., the logic net data, was discussed earlier and will not be further discussed here.

The flow chart of FIGS. 1A and 1B will now be discussed. Following the input of data, represented by block 104, the process enters the so-called CONVERGE algorithm represented by block 120. The object in the CONVERGE algorithm is to find an orientation and interconnection of modules assuming the modules are points, i.e., ignoring physical considerations of the modules, so that total interconnecting line length is minimized. Making the assumption that the modules are points allows the modules to assume any location on the field regardless of overlap with other modules. So-called attraction vectors are calculated for interconnected modules and then the modules are moved in accordance with these vectors. Logic nets are also reordered if such reordering would reduce total line length.

After the CONVERGE algorithm has been run a suitable number of times, the process enters the BLOWUP algorithm represented by block 124 of FIG. 1B. The object in the BLOWUP algorithm is to find an orientation and interconnection of modules assuming the modules are their true physical size while maintaining near minimum line length. That is, whereas in the CONVERGE algorithm the physical size of the modules was ignored, in the BLOWUP algorithm the physical size is taken into consideration and very little overlap of modules is allowed. So-called physical force vectors as well as attraction vectors are calculated for the modules and then the modules are moved in accordance with such vectors. By such movement, the physical overlap of modules is reduced.

The final general stage of the FIG. 1 process is a so-called Final Assignment stage as represented by block 128. In this stage, the modules are moved to predetermined mounting sites while maintaining the general orientation of modules as derived by the BLOWUP algorithm. The modules will have been positioned by the BLOWUP algorithm in such a way that each module can be assigned a predetermined site thereby eliminating any remaining small overlaps between modules and between modules and field boundaries. The Final Assignment stage utilizes the so-called Munkre assignment algorithm described, for example, L.S. Goddard, *Mathematical Techniques of Operation Research*, Addison-Wesley Publishing Company, Inc. 1963, Reading, Massachusetts, pages 75–84.

After completion of the Final Assignment stage, a decision is made as to whether the process has been run the maximum number of allowed runs and as to whether the total line length resulting from the last run changed less than a small percentage *j*, where *j* is an arbitrary number chosen by the user. See block 132 of FIG. 1B. If either event has occurred, the algorithm terminates and an output is generated of the resulting configuration of the modules. See block 140 of FIG. 1B. If neither event has occurred, the program parameters are updated for another run using the data derived in the previous run in accordance of block 136 of FIG. 1A. The CONVERGE algorithm is then entered again and the process is repeated.

Figure 5:
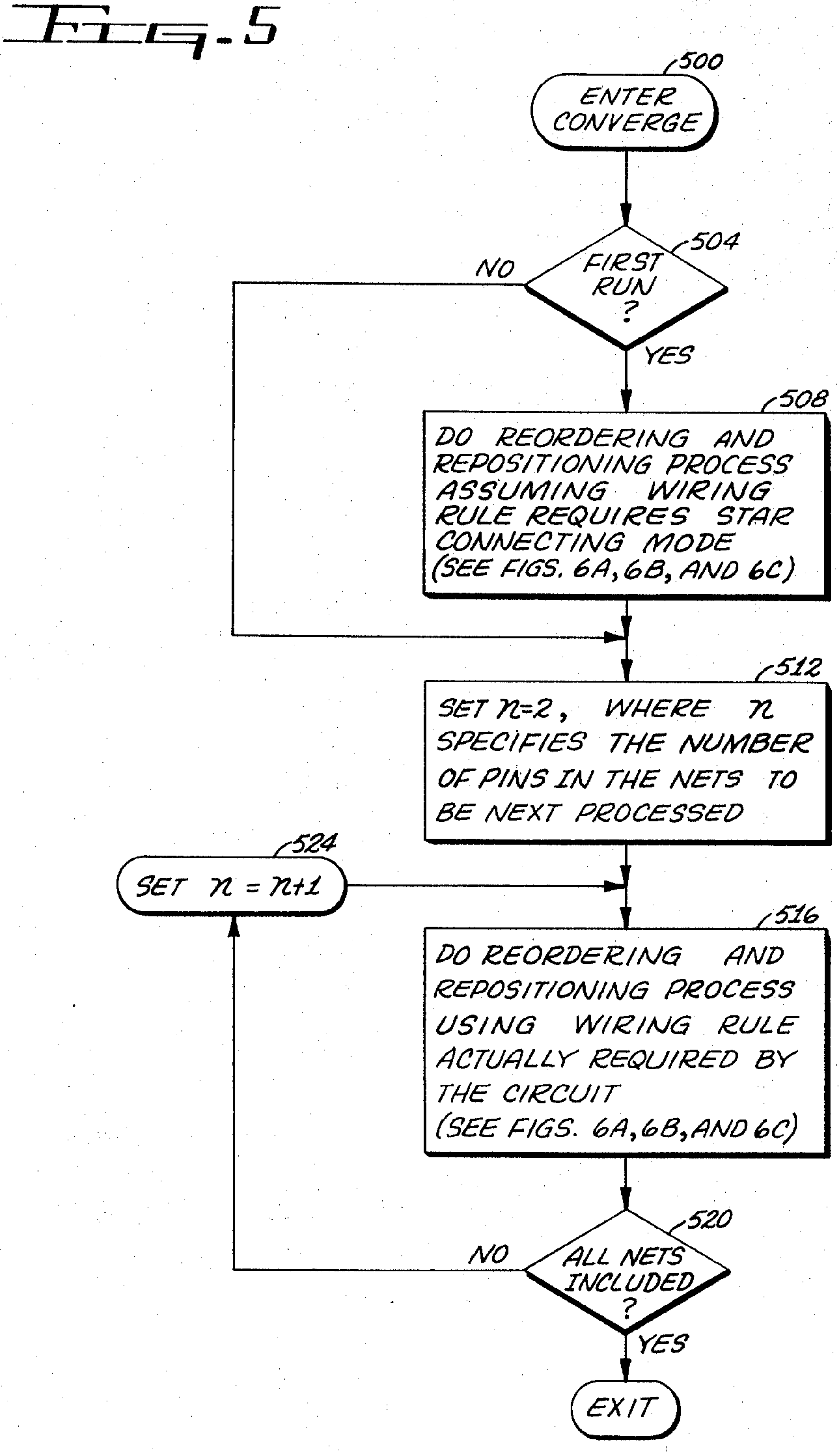
FIG. 5 shows a generalized flow diagram of the CONVERGE algorithm of the FIGS. 1A and 1B process.
Figure 6A:
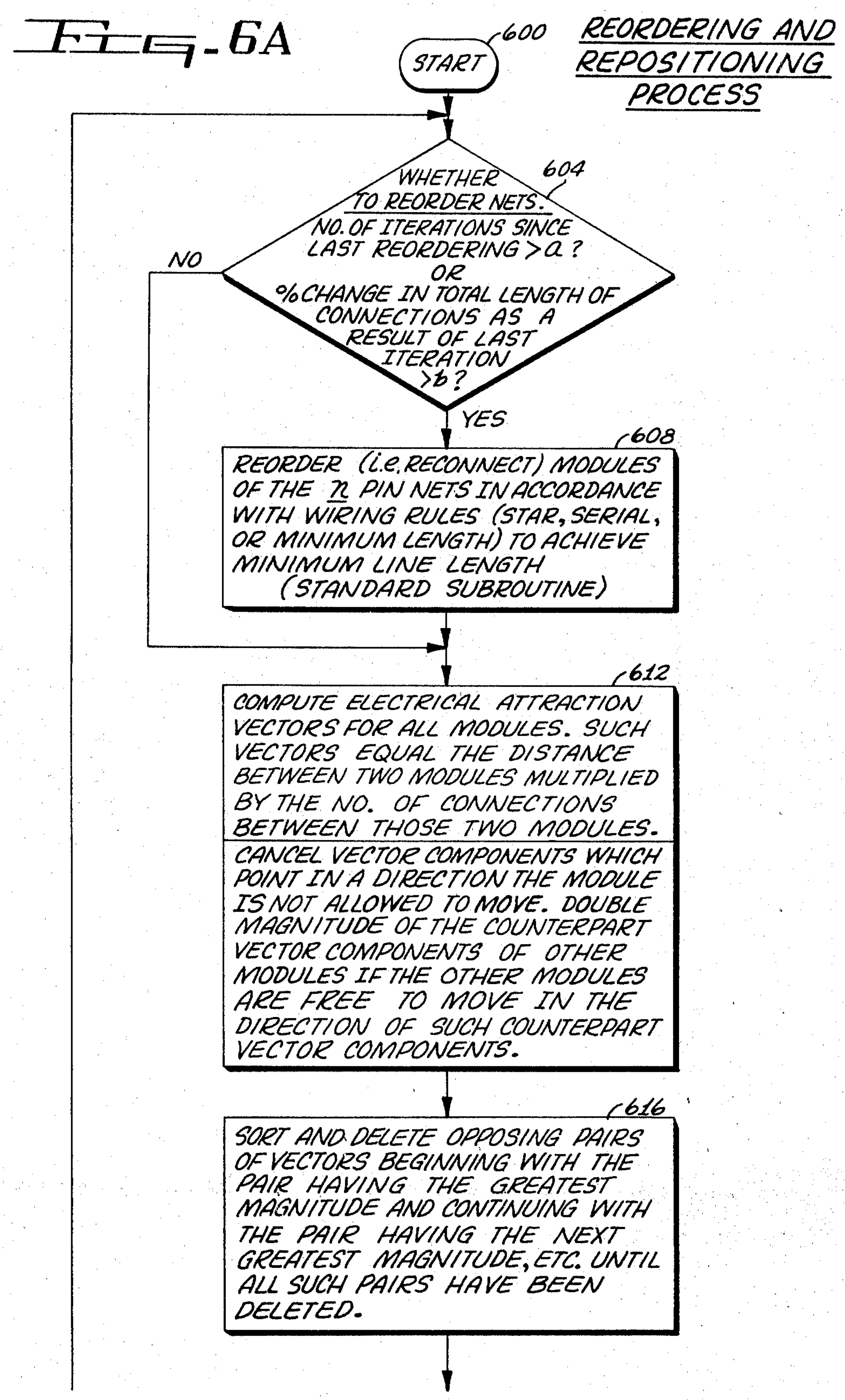
FIGS. 6A, 6B, and 6C, with FIG. 6A positioned above FIG. 6B and FIG. 6B positioned above
Figure 6B:
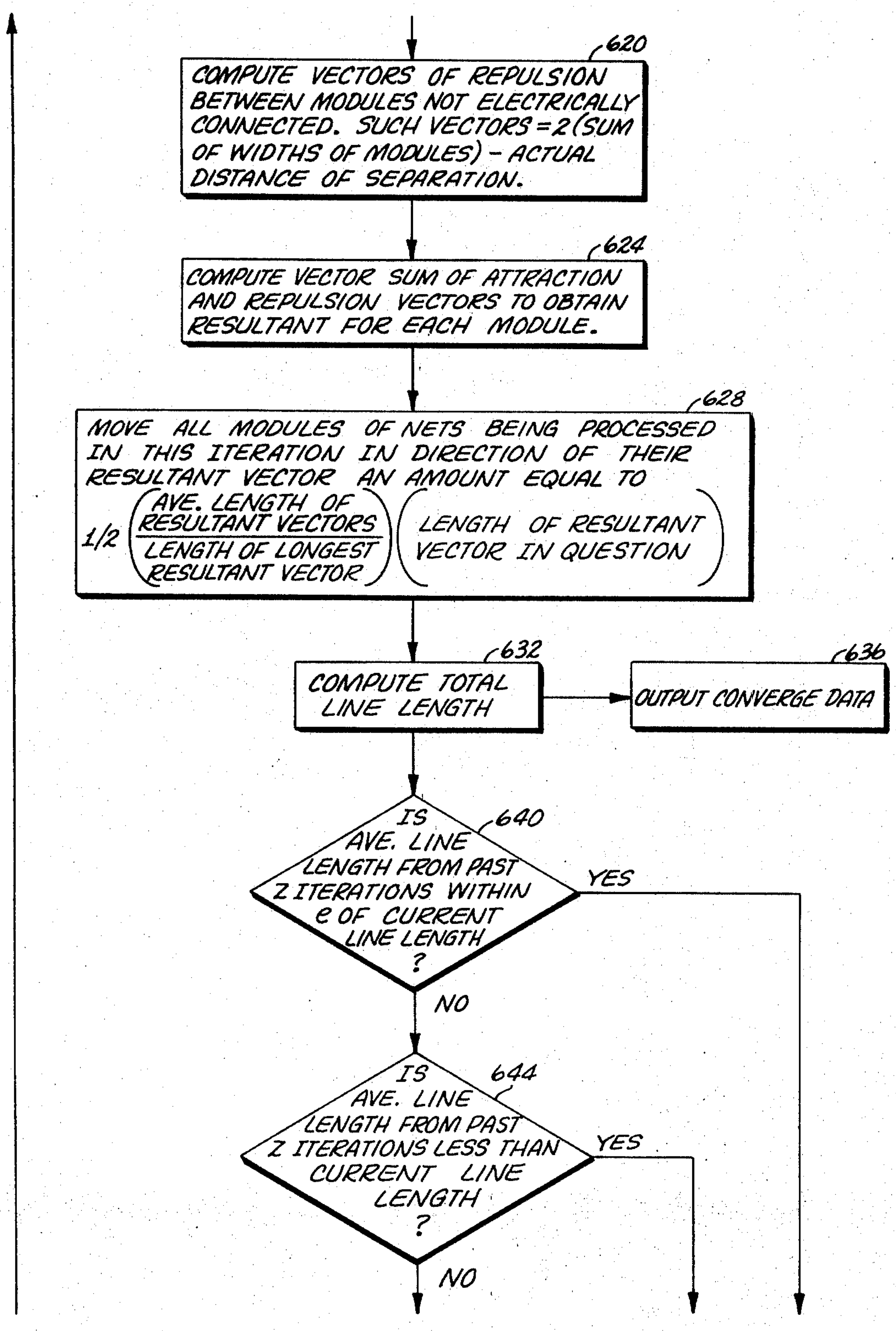
Figure 6C:
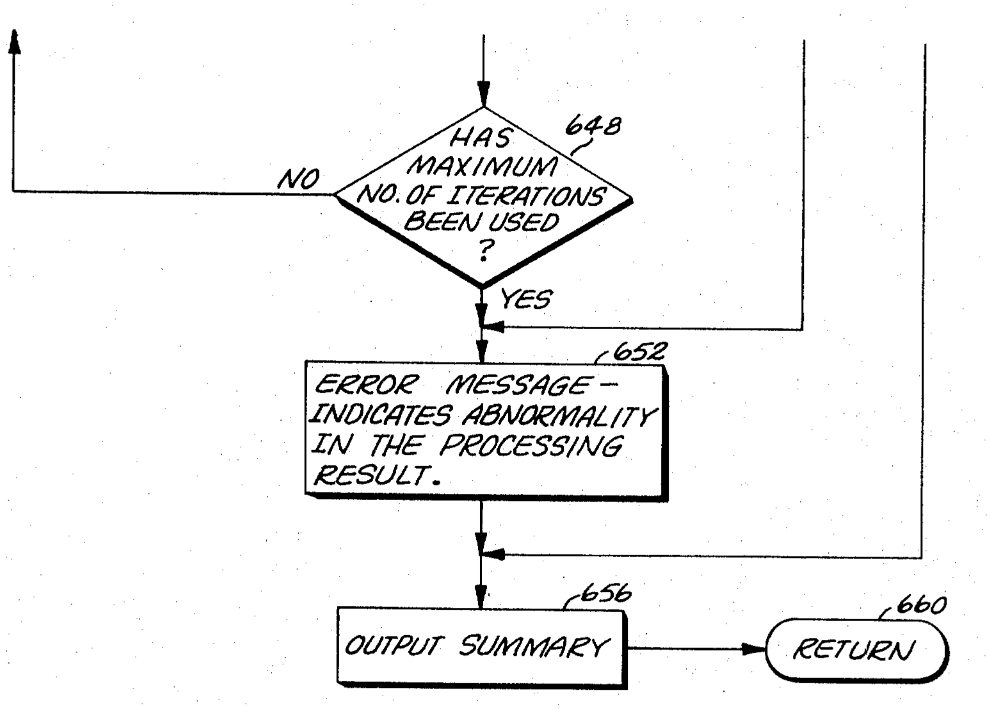

The CONVERGE algorithm and the BLOWUP algorithm of FIG. 1 will now be described in detail. FIG. 5 shows an overview of the CONVERGE process and FIGS. 6A, 6B, and 6C show the details of the CONVERGE process and specifically of the reordering and repositioning steps of the CONVERGE process. As indicated in FIG. 5, the first step of the CONVERGE process is to determine whether or not the run now being carried out is the first run. (See block 504.) If it is the first run, the algorithm moves to block 508, otherwise it moves to block 512. The step of the CONVERGE algorithm represented by block 508 and detailed in FIGS. 6A, 6B, and 6C is carried out assuming a star mode interconnection requirement. In the star mode, all nets are two-pin nets. (This is evident from FIG. 3.) The purpose of assuming a star mode interconnection at this stage is that it facilitates getting related modules into the same general area on the field even though such modules may not be directly interconnected.

After the stage of the CONVERGE algorithm represented by block 508 is completed, the algorithm moves on to block 512. Here, a variable *n* is set equal to two, where *n* specifies the number of pins in the nets to be next processed. That is, only nets having two pins will be next processed in the CONVERGE algorithm. The algorithm then moves to block 516 where that portion of the CONVERGE process detailed in FIGS. 6A, 6B, and 6C is carried out in accordance with the actual wiring requirement of the circuit board being processed. Such wiring requirement, as already indicated, may be a star mode connection, a serial mode connection, or the minimum line length mode connection.

The next step is to determine if all nets of the circuit have been processed (block 520). If they have, the algorithm is exited. If they have not, the variable *n* is incremented by one (block 524) and all nets having the number of pins equal to the new value of *n* are next processed. This cycle continues until all nets have been processed.

FIGS. 6A, 6B, and 6C which show the details of the steps represented by blocks 508 and 516 of FIG. 5, will now be described. The first step of the process of composite FIG. 6 is to determine if the *n* pin nets should be reordered. (See block 604 of FIG. 6A.) If either the number of iterations of the CONVERGE algorithm since the last reordering is greater than a predetermined number *a*, or the percentage of change in the total line length of interconnections as a result of the last iteration is greater than a percentage *b*, then the algorithm moves to block 608, otherwise it moves to block 612. The values of *a* and *b* may be anything desired by the user. The value of *a* might illustratively be 10 and the value of *b* might illustratively be 4. The purpose of the decision function 604 is to stimulate a reordering of nets if reordering has not taken place recently or if large changes in total line length are occurring as a result of reordering.

In accordance with the step represented by block 608, the interconnections of modules of the nets then being processed are changed in keeping with the wiring rules if such changes result in the line length of each such net being reduced. The method of performing such reordering is standard in the prior art as disclosed for example in H. Loberman and A. Weinberger, "Formal Procedures for Connecting Terminals with a Minimum Total Wire Length," *Journal of the ACM*, volume 4, pages 428–437, October 1957. Also see F.S. Hillier and G.J. Lieberman, *Introduction to Operations Research*, Holden-Day, Inc., San Francisco 1967, pages 194–204 and pages 222–225.

In the next step of the algorithm (block 612), an electrical attraction vector for each module of every pair of interconnected modules is computed. Such vectors, of course, may be divided into their X and Y vector components whose magnitudes will be designated *x* and *y* respectively. The attraction vector for any module of a pair is directed toward the other module of the pair and has a magnitude equal to the distance separating the pair multiplied by the number of connections therebetween, subject to the following constraints. All vector components on each module of a pair which point in a direction in which the module is not allowed to move have a magnitude of zero. Conversely, the magnitude of those vector components of the other module of the pair which are counterparts to the components of zero magnitude (and oppositely directed) is doubled if the other module is free to move in the direction of those components. Thus, the X vector component would have a magnitude of zero if the module with which the component was associated were a fixed module, a fixed X module, or a fixed X bar module and would have a magnitude of $2x$ if the module were a free module, a fixed Y module, or a free bar module and the other module of the pair were a fixed module, a fixed X module, or a fixed X bar module. Similarly, the Y vector component would have a magnitude of zero if the module with which it was associated were a fixed module, a fixed Y module or a fixed Y bar module and would have a magnitude of $2y$ if the module were a free module, a fixed X module, or a free bar module or the other module of the pair were a fixed module, a fixed Y module, or a fixed Y bar module.

Figure 7:
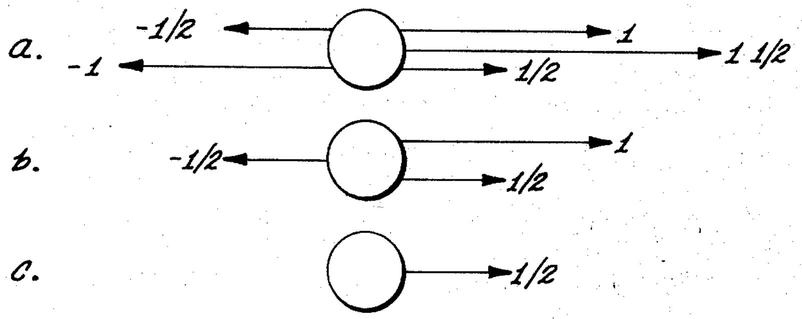
FIG. 7 illustrates the operation of the sort and delete step of the algorithm of FIGS. 6A, 6B, and 6C.

After the vectors are calculated, a module may have a number of vectors associated therewith since that module may be connected to a number of different modules. The next step of the algorithm, as represented by block 616, is to sort and delete, for each module, opposing pairs of vectors beginning with vectors of greatest magnitude until all such pairs are deleted. FIG. 7 shows three stages of the sort and delete process for an exemplary module. The module in question is shown only with X-components consisting of two components in the negative direction, one of magnitude $-\frac{1}{2}$ and one of magnitude $-1$, and three components in the positive direction, one of magnitude $+1$, one of magnitude $+1\frac{1}{2}$, and one of magnitude $+\frac{1}{2}$.

The first step of the sort and delete process of block 616 of FIG. 6B as applied to the module of part *a.* of FIG. 7 would be to eliminate the vector having the greatest magnitude in the negative direction, viz, the vector with the magnitude of $-1$, and to eliminate the vector having the greatest magnitude in the positive direction, viz, the vector having a magnitude of $+1\frac{1}{2}$. This would yield the module shown in part *b.* of FIG. 7. In the next step of the sort and delete process, the opposing vectors having the greatest magnitude are again eliminated to yield the module shown in part *c.* of FIG. 7. It has been found that this sort and delete process gives better results than if normal vector summation were used to obtain a single resultant vector.

The next step of the algorithm, as indicated by block 620 of FIG. 6B, is to compute repulsion vectors between each pair of unconnected modules. Each such vector has a magnitude equal to 2 times the sum of the widths of the two unconnected modules in question minus the distance of separation between the center points of the two modules, with negative values being set to zero. This magnitude is likewise subject to the constraints discussed in connection with the computation of attraction vectors. As will be made clear later, the purpose of computing such vectors is to cause unconnected modules to be separated a distance of at least approximately two module widths. Thus, if the center points of two modules are separated at least two module widths, the vectors of repulsion between the modules are zero.

In the next step of the algorithm, represented by block 624 of FIG. 6B, the vector sum of the attraction and repulsion vectors are computed for each module to obtain a resultant vector thereof.

After resultant vectors are obtained for each module, all modules of nets having *n* pins are moved in the direction of their resultant vector by an amount equal to:

$$\frac{1}{2}\left\{\frac{\text{average length of all resultant vectors}}{\text{length of longest resultant vector}}\right\}\left\{\begin{array}{c}\text{length of resultant}\\ \text{vector of module}\\ \text{being moved}\end{array}\right\}$$

By moving each module in accordance with the above formula, a large move is guaranteed for those modules having a large resultant vector while only small moves are allowed for those modules having small resultant vectors. Further, the formula assures that no crossovers or overshoots will occur with modules being moved toward each other. By allowing large initial moves of modules having large resultant vectors, the time required to run the process in a data processing system is significantly reduced.

Following the moving of modules, the total interconnecting line length for all modules is computed in accordance with block 632 of FIG. 6B and the resultant of such computation is made available for output as indicated in block 636.

A three-step decision is then made as to whether (1) that portion of the CONVERGE process represented by FIGS. 6A, 6B, and 6C is to be terminated, (2) the portion is to be run again, or (3) an abnormality of some type has occurred in the processing. The first part of this decision, as indicated in block 640 of FIG. 6B, includes a determination as to whether the average total line length of the past *z* iterations is within *e* percentage of the total line length just computed (by the step represented by block 632). The values of *z* and *e* are to be chosen by the user. The value of *z* might illustratively be 5 and the value of *e* might illustratively be 0.0001 percentage. If the average line length of the past *z* iterations is close to the current line length, then very little improvement resulted from the last iteration indicating that the process should be terminated. If this is the case, then the algorithm goes to block 656 of FIG. 6C which indicates that the data which defines the final positioning of the modules for this portion of the CONVERGE process is to be made available for output.

If the average line length of the past *z* iterations is not within *e* percentage of the current line length, then the algorithm moves to block 644 where it is determined if the average line length of the past *z* iterations is less than the current line length. If it is, this indicates that the total line length forms a nondecreasing function and this is not desired. Therefore the algorithm moves to block 652 where an error message is generated indicating an abnormality in the processing result. At this point the user would be notified of the abnormality so that he could take whatever action was necessary. If the average line length of the past *z* iterations is greater than the current line length indicating that an improvement resulted from the last iteration, then the algorithm moves to block 648. There it is determined if the maximum number of iterations allowed has been made. If so, the algorithm again moves to block 652 indicating an abnormality in the last iteration. This abnormality is simply that a significant reduction in line length is still being obtained by the process even though the maximum number of iterations has been made. The initial choice of a maximum number of iterations to allow, of course, was made so that after the last of such iterations no significant change should occur. If it did occur then something is wrong and should be investigated.

If the maximum number of iterations has not been made, then the algorithm returns to block 604 of FIG. 6A and the process described above is repeated. If all has gone well in the FIGS. 6A, 6B, and 6C portion of the CONVERGE process, then as indicated earlier, the data identifying the positioning of modules is made available for output as indicated by block 656. This portion of the CONVERGE algorithm is then exited as per block 660.

The details of the BLOWUP algorithm represented generally by block 124 of FIG. 1A and in detail by FIGS. 8A, 8B, 8C, and 8D will now be described. The BLOWUP algorithm comprises two phases, referred to as the "unbounded" "bounded" phases. In the unbounded phase, the borders or edges of the field on which the modules are positioned are ignored. That is, the modules are allowed to move outside the borders of the field in the process of their being repositioned. In the bounded phase, the modules are required to stay within the boundaries of the field. If modules had been moved off the field in the unbonded phase, then they must be moved back on the field during the bounded phase.

Figure 8A:
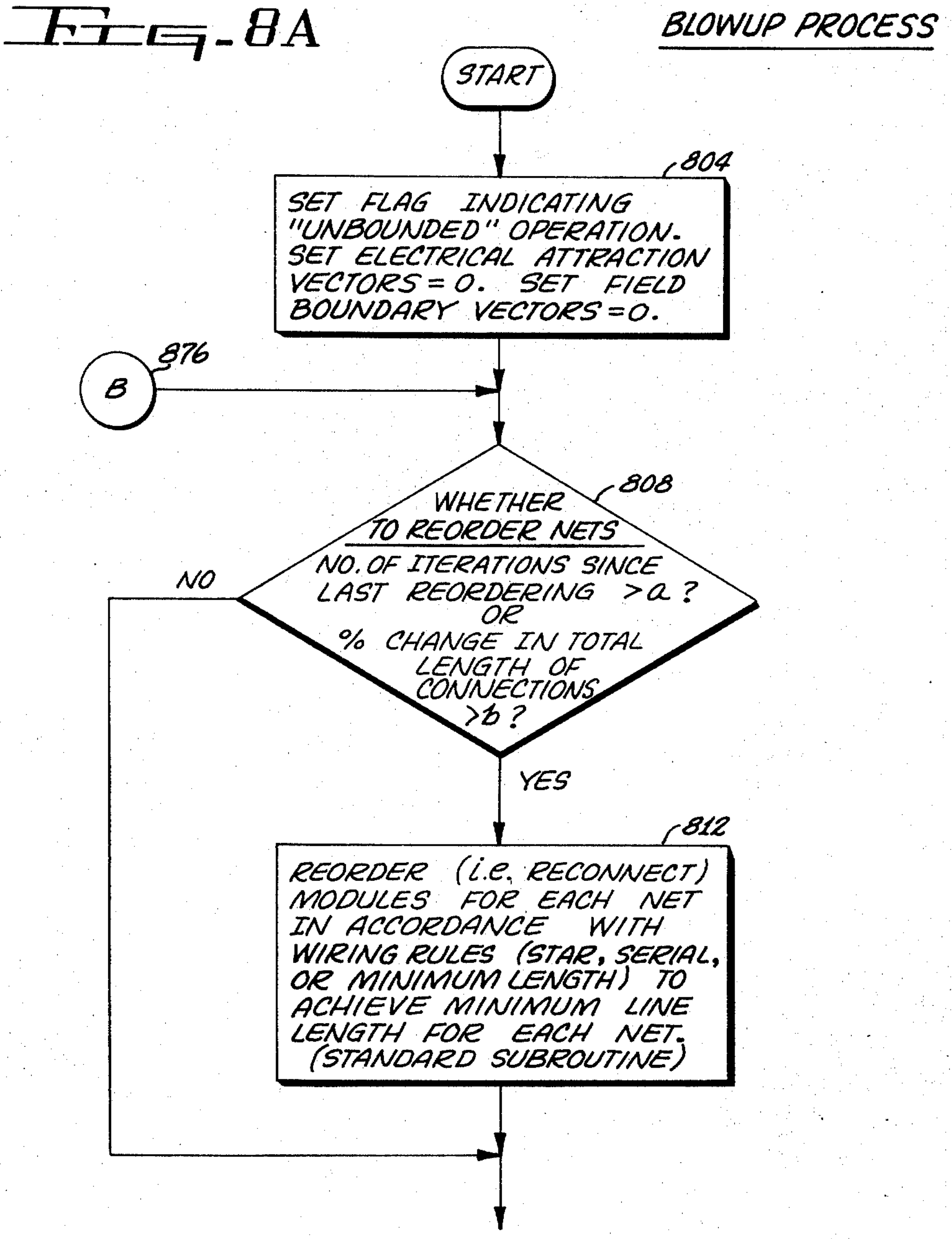
FIGS. 8A, 8B, 8C, and 8D, with FIG. 8A positioned above FIG. 8B, FIG. 8B positioned above FIG. 8C, and FIG. 8C positioned above

The first step of the BLOWUP algorithm, as indicated by block 804 of FIG. 8A, is to set a flag indicating that the unbounded phase is to be commenced. Also at this time, the electrical attraction vectors and the field boundary vectors of all modules are set equal to zero. Of course, when carrying out the first iteration of the BLOWUP process, no modules will have field boundary vectors.

The next two steps of the BLOWUP algorithm (blocks 808 and 812 of FIG. 8A) are identical to the steps represented by block 604 and 608 of the CONVERGE process of FIG. 6A. In these steps, the circuit nets are reordered if reordering is required.

Figure 8B:
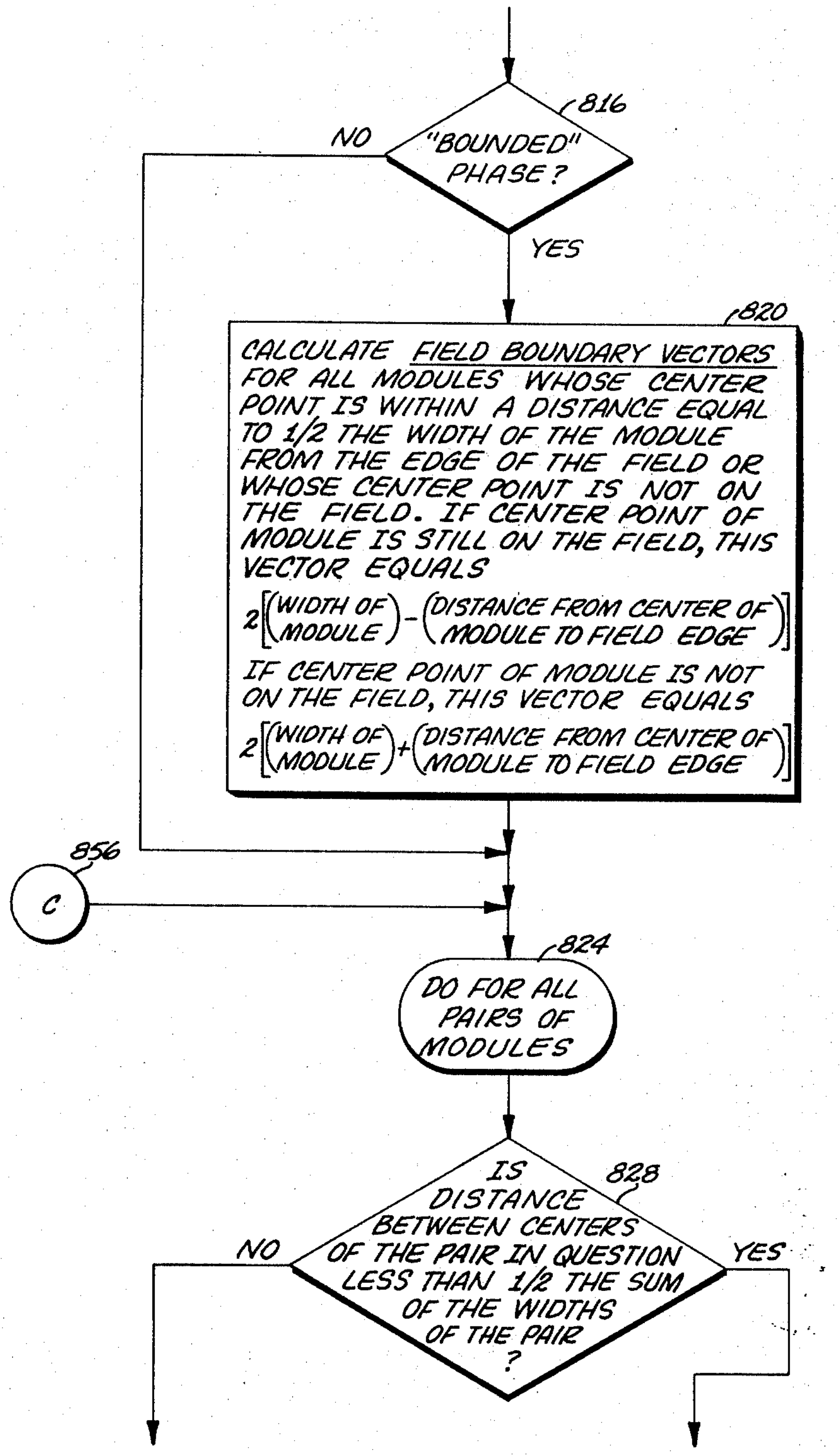

The next step of the process, as indicated by block 816 of FIG. 8B, is to determine whether the process is in the bounded phase. If it is, the algorithm moves to block 820, otherwise it moves to block 824. For purposes explanation it will be assumed that the BLOWUP algorithm is in the bounded phase rather than in the unbounded phase. This would be the case if the BLOWUP process had been completed through block 892 of FIG. 8D where a flag would have been set indicating the "-bounded" operation is to be performed. The algorithm would then have returned to step 808 of FIG. 8A.

In the step represented by block 820 of FIG. 8B, a so-called field boundary vector is calculated for each module whose center point is within a distance equal to one-half the width of the module from the edge of the field or whose center point is not on the field. If the center point of a module is still on the field, this vector is equal to 2[(width of module)–(distance from center of module to field edge)].

If the center point of the module is not on the field, this vector is equal to

2[(width of module)+(distance from center of module to field edge)].

The direction of all field boundary vectors is perpendicular to the edge thereof, and away from the field edge if the module is on the field and toward the field edge if the module is not on the field. The quantities in brackets in the above relations are doubled (i.e., multipled by 2 ) since the field edge is treated as is a fixed module.

After the field boundary vectors are calculated, the BLOWUP process enters a phase which successively repeats itself for each pair of modules. (See block 824 of FIG. 8B.) The first step of this phase is to determine if the pair being examined overlap. Specifically, as indicated by block 828 of FIG. 8B, it is determined whether the distance between the centers of the pair in question is less than one-half the sum of the widths of the pair. If this distance is less, then the algorithm moves to block 840. There, the so-called overlap vectors for the pair are computed. These vectors equal $$\frac{\left\{\begin{matrix}\text{sum of widths of}\\ \text{overlapping modules}\end{matrix}\right\}}{2} - \left\{\begin{matrix}\text{distance separating}\\ \text{centers of}\\ \text{overlapping modules}\end{matrix}\right\}$$

One such overlap vector is assigned to each module of the pair and is directed from its corresponding module in a direction opposite the direction in which the other module of the pair lies. Again, the magnitude of the overlap vectors are subject to the same constraints discussed for the attraction vectors. The boundary vectors and overlap vectors for each module are then vectorially summed to obtain a so-called physical vector (see block 848).

Figure 8C:
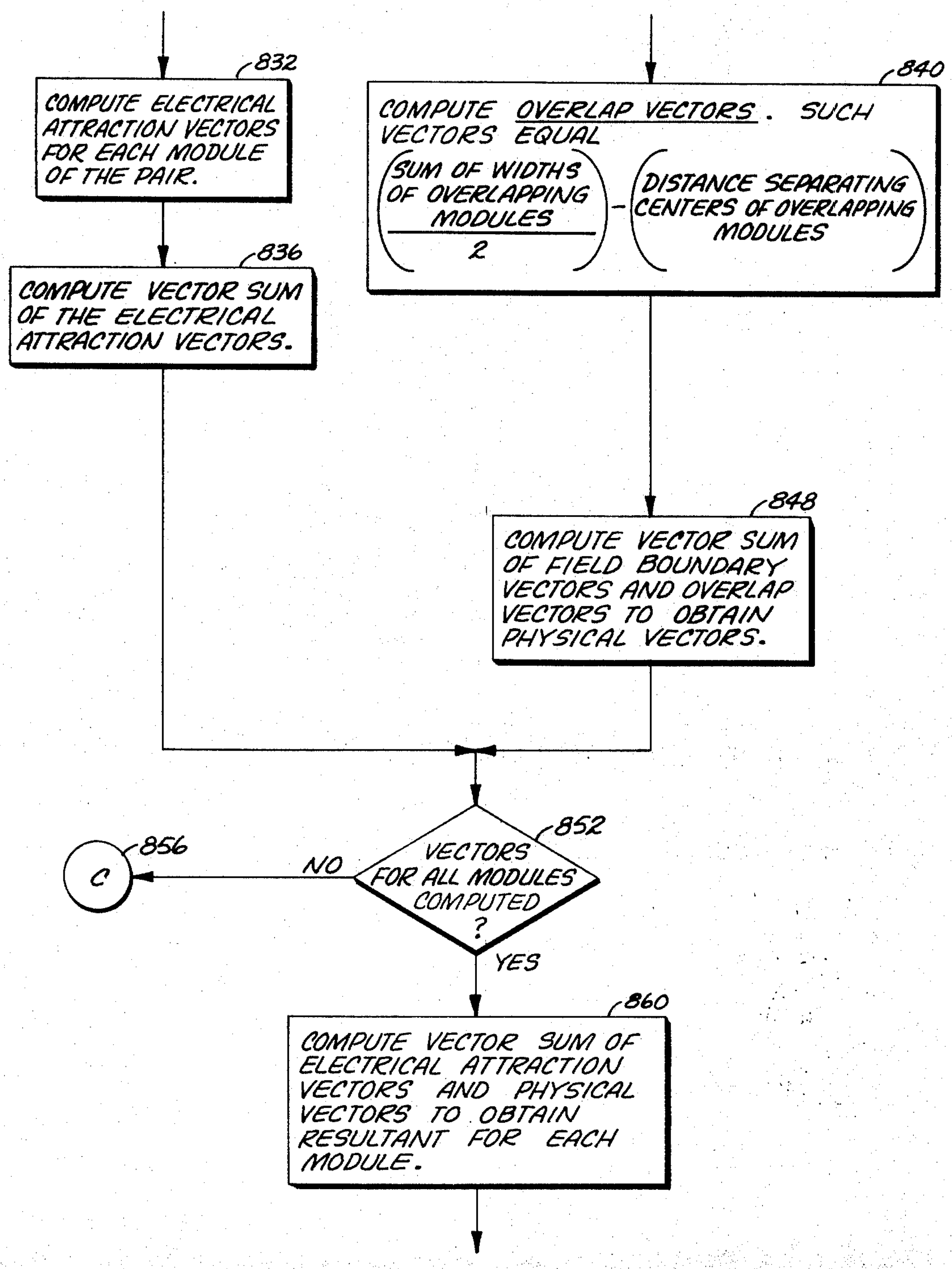
Figure 8D:
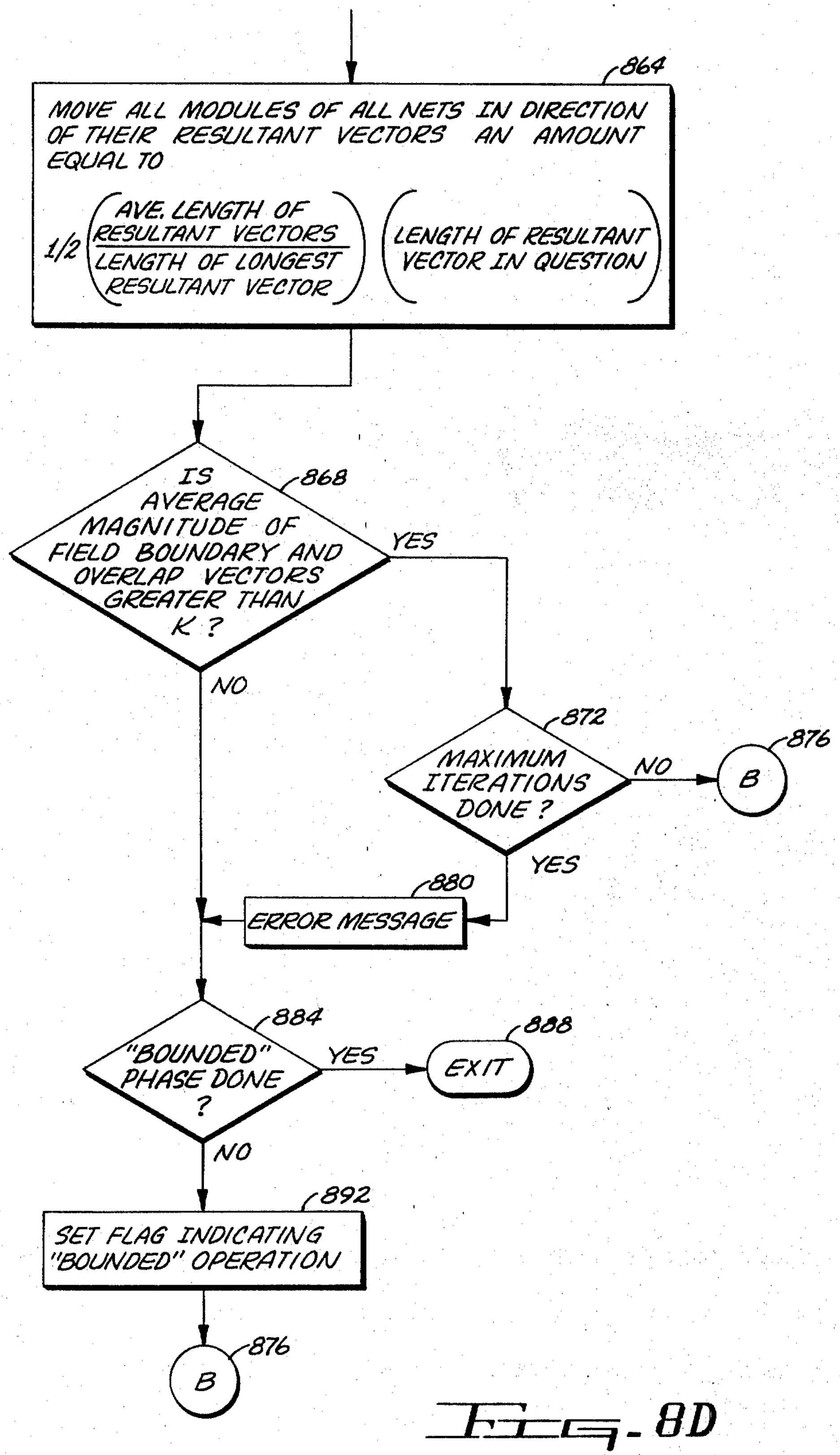

Referring again to block 828 of FIG. 8B, if the distance between the centers of the pair of modules being examined is greater than one-half the sum of the widths of the pair, then the algorithm moves on to block 832 of FIG. 8C. In the step represented by block 832, electrical attraction vectors are computed for the modules as in the CONVERGE algorithm. Instead of deleting opposing pairs, the simple vector sum of the electrical attraction vectors is then obtained for each module as indicated by block 836.

When the electrical attraction vectors and physical vectors have been computed for all modules, the algorithm moves from block 852 to block 860. There, the vector sum of the electrical attraction vectors and physical vectors for each module are computed to obtain a resultant. Thus, module has a single resultant vector (comprising an X and Y component) which takes into consideration connections between modules, physical sizes of the modules, and the boundaries of the field.

The modules are then moved in accordance with the resultant vectors and in accordance with the formula set forth earlier for moving the modules in the CONVERGE process. See block 864 of FIG. 8D. A determination is then made as to whether the average magnitude of the field boundary and overlap vectors is greater than a certain small value *k*. The purpose of the BLOWUP process is to reduce the average magnitude of the field boundary and overlap vectors to less than a certain small value so that any remaining field boundary and overlap vectors will be eliminated in the final phase of the overall placement process (to be discussed later). If the average magnitude of the field boundary and overlap vectors is greater than *k* (determined in block 868) then the algorithm moves to block 872 where it is determined if the maximum number of iterations initially specified by the user have been carried out. If they have not, the algorithm moves via element 876 to block 808 of FIG. 8A and the BLOWUP process is repeated. If the maximum number of iterations has been carried out, then an error message is printed in accordance with block 880. The error message simply indicates that even though the maximum number of iterations has been carried out, the average magnitude of the field boundary and overlap vectors has still not been reduced below *k*. Adjustments would of course have to be made by the user to take care of this situation. Even though the error message is printed out, the algorithm continues to block 884 to determine whether the bounded phase of the BLOWUP algorithm has been completed. The algorithm also moves to block 884 if the average magnitude of the field boundary and overlap vectors was not greater than $k$.

It is then determined whether the bounded phase has been completed as per block 884. If it has, then the BLOWUP algorithm is exited in accordance with block 888. If the bounded phase has not been carried out, a flag is set indicating that the bounded operation is to be commenced as indicated by block 892. The algorithm then returns to block 808 of FIG. 8A and the bounded phase is commenced.

The last general stage of the placement process, as discussed earlier, is the Final Assignment algorithm as represented by block 128 of FIG. 1B. This algorithm positions the modules at the nearest predefined mounting sites while maintaining the general orientation of modules as derived in the BLOWUP process. After the Final Assignment algorithm is completed, a determination is made as to (1) whether the maximum number of runs for the overall placement process has been completed, and (2) whether the total line length changed less than $j$ percent as a result of the last run. See block 132 of FIG. 1B. If either (1) or (2) occurred, data representing the final positioning of modules is made available for output in accordance with block 140. If neither occurred, the program parameters are updated for another run using the data derived in the last run in accordance with block 136 of FIG. 1A. The complete process is repeated until either of the events indicated by block 132 occurs — the occurrence of either event signals the termination of the process.

Composite FIGS. 9 through 17 show one illustrative program implementation of the algorithms of FIGS. 1A, 1B, 5, 6A–6C and 8A–8D. This program was written in the Fortran IV language for processing on a General Electric 635 data processing system. This, of course, is but one of a large number of programs which could be written implementing the algorithms in question.

FIGS. 9A–9F show the main program for carrying out the placement process. The main program initializes parameters for the various subroutines used and generally coordinates the operation of the subroutines. FIGS. 10A–10D show a subroutine implementation of the CONVERGE algorithm represented in FIGS. 5 and 6A–6C. FIGS. 11A–11D show a subroutine implementation of the BLOWUP algorithm represented in FIGS. 8A–8D. FIGS. 12A–12E show a subroutine for computing electrical attraction vectors and for carrying out the sort and delete operation utilized in the CONVERGE algorithm. FIGS. 13A and 13B show a subroutine for computing repulsion vectors. FIG. 14 shows a subroutine for moving modules in accordance with their vector components. FIGS. 15A and 15B show a subroutine for computing the vector sum or resultant vector of a number of component vectors. FIGS. 16A–16C show a subroutine for computing physical vectors for the modules. FIGS. 17A and 17B show a subroutine for computing field or board boundary vectors.

Not all subroutines required in the main program are shown in the drawings but the composition of such subroutines is considered well within the skill of the art.

It is to be understood that the above-described embodiments and program implementation are only illustrative of the application of the principles of the present invention. Numerous modifications may be devised by those skilled in the art without departing from the spirit and scope of the invention.

What is claimed is:

1. A machine process for positioning interconnected modules on a planar field defined by a Cartesian coordinate system having X and Y axes by use of a programmed digital computer having stored in its internal memory a program enabling the computer to perform the following steps:

a. randomly assigning modules to locations on the field, b. calculating an attraction vector for each module of every pair of interconnected modules, said vector being directed from the module in question toward the module to which it is connected and having a magnitude proportional to (i) the distance separating the two modules, and (ii) the number of lines connecting the two modules, c. calculating the X- and Y-components of each attraction vector, d. deleting from each module, pairs of oppositely directed vector components, beginning with the pair having the greatest magnitude in their respective directions and continuing with the pair having the next greatest magnitude, etc. until all such pairs have been deleted, e. calculating a repulsion vector for each module of every pair of unconnected modules, said repulsion vector being directed from the module in question in a direction opposite that in which the other module of the pair lies and having a magnitude inversely proportional to the distance separating the two modules, f. calculating for each module a resultant vector from the module's attraction vectors and repulsion vectors, and g. simultaneously repositioning said modules by moving each in the direction of its resultant vector by an amount proportional to the magnitude of its resultant vector.

2. A process as in claim 1 wherein the magnitude of said attraction vector equals $$\left\{\begin{matrix}\text{distance between the}\\ \text{centers of the two}\\ \text{modules in question}\end{matrix}\right\} \times \left\{\begin{matrix}\text{number of connections}\\ \text{between the two}\\ \text{modules}\end{matrix}\right\}$$

and wherein the magnitude of said repulsion vector equals $$2\left\{\begin{matrix}\text{sum of the widths of}\\ \text{modules in question}\end{matrix}\right\} - \left\{\begin{matrix}\text{distance between}\\ \text{the centers of}\\ \text{the two modules}\end{matrix}\right\},$$

with negative values being set equal to zero.

3. A process as in claim 2 wherein each of said modules is moved by an amount equal to $$\frac{1}{2}\left\{\frac{\begin{matrix}\text{average length of all}\\ \text{resultant vectors}\end{matrix}}{\begin{matrix}\text{length of longest}\\ \text{resultant vector}\end{matrix}}\right\} \times \left\{\begin{matrix}\text{length of resultant}\\ \text{vector of module}\\ \text{being moved}\end{matrix}\right\}.$$

4. A process as in claim 3 wherein the sequence of steps in said process are iterated not more than a predetermined number of times $m$.

5. A process as in claim 4 wherein the steps of said process are performed first on nets having two pins, then on nets having three pins, etc., until all nets have been processed.

6. A process as in claim 5 further comprising the steps of h. calculating the total line length of the interconnection of the modules, i. terminating the process if the average total line length for the past $z$ iterations is within $e$ percentage of the total line length obtained for the most recent iteration, where $z$ and $e$ are predetermined values, j. generating an error indication if the average total line length for the past $z$ iterations is not within $e$ percentage of the total line length obtained for the most recent iteration and either (1) the average total line length for the past $z$ iterations is less than the total line length obtained for the most recent iteration, or (2) the number of iterations completed equals $m$, and k. repeating steps (b) through (j) if the average total line length for the past $z$ iterations is not within $e$ percentage of and is not less than the total line length obtained for the most recent iteration and if the number of iterations completed is less than $m$.

7. A process as in claim 6 further including the steps of l. calculating an attraction vector in accordance with step (b) for each module of every pair of modules whose centers are separated by a distance of more than one-half the sum of the widths of the pair, m. calculating an overlap vector for each module of every pair of modules whose centers are separated by a distance of less than one-half the sum of the widths of the pair, said overlap vector being directed from the module in question in a direction opposite that in which the other module of the pair lies and having a magnitude inversely proportional to the distance separating the pair, n. calculating for each module a resultant vector from the module's attraction vectors and overlap vectors, o. performing step (g).

8. A process as in claim 7 wherein the magnitude of said overlap vector equals $$\frac{\left\{\begin{matrix}\text{sum of widths of}\\ \text{overlapping modules}\end{matrix}\right\}}{2}-\left\{\begin{matrix}\text{distance separating}\\ \text{centers of}\\ \text{overlapping modules}\end{matrix}\right\}.$$

9. A process as in claim 8 further comprising the steps of p. calculating a field boundary vector for each module whose center point is within a distance equal to one-half the width of the module from the edge of the field or whose center point is not on the field, said field boundary vectors being directed from the module in question away from the field edge and perpendicular thereto and having a magnitude of $$2\left[\left\{\begin{matrix}\text{width of the module}\\ \text{in question}\end{matrix}\right\}-\left\{\begin{matrix}\text{distance of center}\\ \text{of module from}\\ \text{field edge}\end{matrix}\right\}\right]$$

if the center point of the module is still on the board, and said field boundary vectors being directed from the module in question toward the field edge and perpendicular thereto and having a magnitude of $$2\left[\left\{\begin{matrix}\text{width of the module}\\ \text{in question}\end{matrix}\right\}+\left\{\begin{matrix}\text{distance of center}\\ \text{of module from}\\ \text{field edge}\end{matrix}\right\}\right]$$

if the center of the module is not on the field, q. performing steps (l) and (m), r. calculating for each module a resultant vector from the module's field boundary vectors, attraction vectors, and overlap vectors, and s. performing step (o).

10. A process as in claim 1 further comprising the step of reordering the connections of said modules in accordance with predetermined connection rules if the total line length is reduced by such reordering.

11. A machine process for positioning interconnected modules on a planar field defined by a Cartesian coordinate system having X and Y axes by use of a programmed digital computer having stored in its internal memory a program enabling the computer to perform the following steps:

a. designating as a fixed module each module whose center point is to have predetermined X and Y coordinates on the field, b. designating as a fixed X module each module whose center point is to have a predetermined X coordinate on the field, c. designating as a fixed Y module each module whose center point is to have a predetermined Y coordinate on the field, d. designating as a free module each module which may be assigned any position on the field, e. designating each module having a nonlimited length in one dimension as a free bar module if the module may be assigned any position on the field, as a fixed X bar module if the center line along the nonlimited length of the module has a predetermined X coordinate on the field, and as a fixed Y bar module if the center line along the nonlimited length of the module has a predetermined Y-coordinate on the field, f. representing each void on said planar field as a module whose dimensions correspond to the dimensions of the void, g. randomly assigning field coordinates to each free module, randomly assigning a Y field coordinate to each fixed X module, randomly assigning an X field coordinate to each fixed Y module, randomly assigning an X field coordinate to each free bar module extending in the Y direction, and randomly assigning a Y field coordinate to each free bar module extending in the X direction, Y h. calculating an attraction vector for each module of every pair of interconnected modules, said vector being directed from the module in question toward the module to which it is connected, said vector having a magnitude $q$ proportional to (1) the distance separating the two modules and (2) the number of lines connecting the two modules if said pair of modules are free modules and having X and Y components of magnitude $x_1$ and $y_1$ respectively, said vector's X component having a magnitude of zero if said module in question is a fixed module, a fixed X module, or a fixed X bar module and having a magnitude of $2x_1$ if said module in question is a fixed module, a fixed Y module, or a free bar module and said other module is a fixed module, a fixed X module or a fixed X bar module, and said vector's Y component having a magnitude of zero if said module in question is a fixed module, a fixed Y module, or a fixed Y bar module and having a magnitude of $2y_1$ if said module in question is a free module, a fixed X module, or a free bar module and said other module is a fixed module, a fixed Y module, or a fixed Y bar module, i. deleting from each module pairs of oppositely directed vector components, beginning with the pair having the greatest magnitude in their respective directions and continuing with the pair having the next greatest magnitude, etc. until all such pairs have been deleted, j. calculating a repulsion vector for each module of every pair of unconnected modules, said repulsion vector being directed from the module in question away from the other module of the pair, said vector having a magnitude $r$ inversely proportional to the distance separating the two modules if said pair of modules are free modules and having X and Y components of magnitude $x_2$ and $y_2$ respectively, said repulsion vector's X component having a magnitude of zero if said module in question is a fixed module, a fixed X module, or a fixed X bar module and having a magnitude of $2x_2$ if said module in question is a free module, a fixed Y module, or a free bar module and said other module is a fixed module, a fixed X module, or a fixed X bar module, and said repulsion vector's Y component having a magnitude of zero if said module in question is a fixed module, a fixed Y module, or a fixed Y bar module and having a magnitude of $2y_2$ if said module in question is a free module, a fixed X module, or a free bar module and said other module is a fixed module, a fixed Y module, or a fixed Y bar module, k. calculating for each module a resultant vector from the module's attraction vectors and repulsion vectors, and l. simultaneously repositioning said modules by moving each in the direction of its resultant vector by an amount proportional to the magnitude of its resultant vector.

12. A process as in claim 11 wherein the magnitude $q$ of said attraction vector equals $$\left\{\begin{array}{c}\text{distance between the}\\ \text{centers of the two}\\ \text{modules in question}\end{array}\right\}\times\left\{\begin{array}{c}\text{number of connections}\\ \text{between the two}\\ \text{modules}\end{array}\right\}$$

and wherein the magnitude $r$ of said repulsion vector equals $$2\left\{\begin{array}{c}\text{sum of the widths of}\\ \text{the modules in question}\end{array}\right\}-\left\{\begin{array}{c}\text{distance between}\\ \text{the centers of}\\ \text{the two modules}\end{array}\right\},$$

with negative values being set equal to zero.

13. A process as in claim 12 wherein each of said modules is moved by an amount equal to $$\frac{1}{2}\left\{\frac{\text{average length of all resultant vectors}}{\text{length of longest resultant vector}}\right\}\times\left\{\begin{array}{c}\text{length of resultant}\\ \text{vector of module}\\ \text{being moved}\end{array}\right\}.$$

14. A process as in claim 13 wherein the sequence of steps in said process are iterated not more than a predetermined number of times $m$.

15. A process as in claim 14 wherein the steps of said process are performed on nets having $n$ pins, where $n$ is initially set equal to two and then successively incremented by one after each iteration of the process until all nets have been processed.

16. A process as in claim 15 further comprising the steps of m. calculating the total line length of the interconnections of the modules, n. terminating the process if the average total line length for the past $z$ iterations is within $e$ percentage of the total line length obtained for the most recent iteration, where $z$ and $e$ are predetermined values, o. generating an error indication if the average total line length for the past $z$ iterations is not within $e$ percentage of the total line length obtained for the most recent iteration and either (1) the average total line length for the past $z$ iterations is less than the total line length obtained for the most recent iteration, or (2) the number of iterations completed equals $m$, and p. repeating steps (h) through (o) if the average total line length for the past $z$ iterations is not within $e$ percentage of and is not less than the total line length obtained for the most recent iteration and if the number of iterations completed is less than $m$.

17. A process as in claim 16 further including the steps of q. calculating an attraction vector in accordance with step (h) for each module of every pair of modules which are separated by a distance of more than one-half the sum of the widths of the pair, r. calculating an overlap vector for each module of every pair of modules whose centers are separated by a distance of less than one-half the sum of the widths of the pair, said overlap vector being directed from the module in question away from the other module of the pair, said overlap vector having a magnitude $s$ inversely proportional to the distance separating the pair if said pair of modules are free modules and having X and Y components of magnitude $x_3$ and $y_3$ respectively, said overlap vectors's X component having a magnitude of zero if said module in question is a fixed module, a fixed X module, or a fixed X bar module and having a magnitude of $2x_3$ if said module in question is a free module, a fixed Y module, or a free bar module and said other module is a fixed module, a fixed X module, or a fixed X bar module, and said overlap vector's Y components having a magnitude of zero if said module in question is a fixed module, fixed Y module, or a fixed Y bar module and having a magnitude $2y_1$ if said module in question is a free module, a fixed X module, or a free bar module and said other module is a fixed module, a fixed Y module or a fixed Y bar module, s. calculating for each module a resultant vector from the modules attraction vectors and overlap vectors, t. performing step (1).

18. A process as in claim 17 wherein the magnitude $s$ of said overlap vector equals $$\frac{\left\{\begin{matrix}\text{sum of widths of}\\ \text{overlapping modules}\end{matrix}\right\}}{2} - \left\{\begin{matrix}\text{distance separating}\\ \text{centers of}\\ \text{overlapping modules}\end{matrix}\right\}$$

19. A process as in claim 18 further comprising the steps of u. calculating a field boundary vector for each module whose center point is within a distance equal to one-half of the width of the module of the edge of the field or whose center point is not on the field, said field boundary vector being directed from the module in question away from the field edge and perpendicular thereto if the center point of the module is on the field and toward the field edge and perpendicular thereto if the center point of the module is not on the field, said field boundary vector having a magnitude $t$ proportional to the distance from the center point of the module to the field edge if the center point is not on the field and if the module is a free module, and having a magnitude $u$ inversely proportional to the distance from the center point of the module to the field edge if the center point is still on the field and if the module is a free module, said field boundary vector having X and Y components of magnitude $x_4$ and $y_4$ respectively, said field boundary vector's X component having a magnitude of zero if the module in question is a fixed module, a fixed X module, or a fixed X bar module and having a magnitude of $2x_4$ if said module in question is a free module, a fixed Y module, or a free bar module, and said field boundary vector's Y component having a magnitude of zero if said module in question is a fixed module, a fixed Y module, or a fixed Y bar module and having a magnitude of $2y_4$ if said module in question is a free module, a fixed X module, or a free bar module, v. performing steps (q) and (r), w. calculating for each module a resultant vector from the module's field boundary vector, attraction vectors, and overlap vectors, and x. performing step (t).

20. A process as in claim 19 wherein the magnitude $t$ equals $$2\left[\left\{\begin{matrix}\text{width of module}\\ \text{in question}\end{matrix}\right\} + \left\{\begin{matrix}\text{distance from center of}\\ \text{module to field edge}\end{matrix}\right\}\right]$$

and wherein the magnitude $u$ equals $$2\left[\left\{\begin{matrix}\text{width of module}\\ \text{in question}\end{matrix}\right\} - \left\{\begin{matrix}\text{distance from center of}\\ \text{module to field edge}\end{matrix}\right\}\right]$$

* * * * *